United States Patent
Schmidt et al.

(10) Patent No.: US 11,897,589 B1
(45) Date of Patent: Feb. 13, 2024

(54) REDUCED WAVE-MAKING RESISTANCE OF A VESSEL OPERATING IN A SEAWAY BASED ON TIME-DEPENDENT KELVIN WAKE WAVE GENERATION

(71) Applicants: Terrence W. Schmidt, Danville, CA (US); Jeffrey E. Kline, Severna Park, MD (US)

(72) Inventors: Terrence W. Schmidt, Danville, CA (US); Jeffrey E. Kline, Severna Park, MD (US)

( * ) Notice: Subject to any disclaimer, the term of this patent is extended or adjusted under 35 U.S.C. 154(b) by 0 days.

(21) Appl. No.: 18/455,951

(22) Filed: Aug. 25, 2023

Related U.S. Application Data

(60) Provisional application No. 63/495,673, filed on Apr. 12, 2023.

(51) Int. Cl.
| | | |
|---|---|---|
| *B63B 39/10* | (2006.01) | |
| *B63B 79/20* | (2020.01) | |
| *B63B 79/40* | (2020.01) | |
| *B63B 71/10* | (2020.01) | |

(52) U.S. Cl.
CPC ............... *B63B 39/10* (2013.01); *B63B 71/10* (2020.01); *B63B 79/20* (2020.01); *B63B 79/40* (2020.01)

(58) Field of Classification Search
CPC ......... B63B 39/10; B63B 71/10; B63B 79/20; B63B 79/40

USPC .......................................................... 701/21
See application file for complete search history.

(56) References Cited

U.S. PATENT DOCUMENTS

| | | | |
|---|---|---|---|
| 10,921,809 B2* | 2/2021 | Berg | ........................ G01S 17/58 |
| 2016/0147223 A1* | 5/2016 | Edwards | ................. B63B 79/40 |
| | | | 701/2 |
| 2018/0105236 A1* | 4/2018 | Bhageria | ............... G01C 21/203 |
| 2021/0078682 A1* | 3/2021 | Schmidt | .................. B63B 79/40 |

* cited by examiner

*Primary Examiner* — Peter D Nolan
*Assistant Examiner* — Luke Huynh
(74) *Attorney, Agent, or Firm* — Renner, Otto, Boisselle & Sklar, LLP

(57) ABSTRACT

A system and method that reduces wave-making resistance of at least one follower vessel following at least one lead vessel operating in a seaway based on a determination of time-dependent variations in the Kelvin wake waves being generated by the lead vessel when operating in a seaway. By using a time-dependent Kelvin wake wave generation approach, the determination of where to position the follower vessel in a reduced wave-making resistance region may be improved, such as when the lead vessel changes direction and/or speed in the seaway. Such an approach may position the follower vessel based on information associated with the Kelvin wake wave generated by the lead vessel in the past, which the follower vessel approaches this past-generated Kelvin wake wave and is positioned in the reduced wave-making resistance region associated with this past-generated Kelvin wake wave.

45 Claims, 20 Drawing Sheets

REDUCED WAVE-MAKING RESISTANCE OF A VESSEL OPERATING IN A SEAWAY BASED ON TIME-DEPENDENT KELVIN WAKE WAVE GENERATION

This application claims priority to U.S. Application No. 63/495,673, filed Apr. 12, 2023, which is hereby incorporated herein by reference in its entirety.

TECHNICAL FIELD

The present disclosure relates generally to spatial control of vessels, and more particularly to reducing spatial control requirements for maintaining reduced wave-making resistance of vessels operating in a seaway based on time-dependent Kelvin wake wave generation such as to account for divergent paths of the lead vessel.

BACKGROUND

Vessels operating in a seaway may be subjected to a wide array of operating costs. A major operating cost may include fuel consumption of the vessel, which may be affected by multiple factors.

SUMMARY

One exemplary factor that may affect fuel consumption of vessels operating in the seaway may include wave-making resistance of the vessels. Wave-making resistance may be caused by the production of a wake pattern as the vessels move across the surface of the seaway. In 1887, Lord Kelvin demonstrated that a wake pattern created by an object (e.g., vessels) moving at a uniform speed over a surface of water (e.g., the seaway) may always be delimited by an angle equal to arcsine 1/3=19.5 degrees. As such, the wake pattern produced by the vessels as they move across the surface of the seaway is known as a Kelvin wake.

In producing the Kelvin wake, vessels displace water as they travel over the surface of the seaway which requires energy. This energy is typically reflected as the wave-making resistance of the vessels (i.e., the amount of energy needed to displace the water out of the way of the hull of the vessels to move across the surface of the seaway). As such, the wave-making resistance of the vessels may affect the fuel consumption required for operating the vessels in the seaway (i.e., a higher wave-making resistance of the vessels may be associated with a higher fuel consumption cost of the vessels). U.S. patent application Ser. No. 16/988,668 filed Mar. 18, 2021 by the present inventors disclosed one or more aspects of a system and method that reduces wave-making resistance of vessels, thereby resolving at least some of these problems associated with vessels. As such, the present disclosure is related to U.S. application Ser. No. 16/988,668, which is hereby incorporate herein by reference in its entirety.

Another exemplary factor that may affect fuel consumption of vessels operating in the seaway may include seaway-induced vessel motions caused by seaway waves. For example, interactions between the vessels and the seaway waves may cause seaway-induced vessel motions that alter desired tracks of the vessels. To return to the desired tracks, the vessels may consume fuel. As such, seaway-induced vessel motions caused by the sea waves may affect the fuel consumption required for operating the vessels in the seaway (i.e., a greater return distance to desired tracks and/or a higher amount of return to desired tracks instances may be associated with a higher fuel consumption cost of the vessels). Accordingly, in U.S. patent application Ser. No. 17/682,571 filed Feb. 28, 2022, the present inventors describe a system and method that reduces positioning control requirements for maintaining reduced wave-making resistance of at least one vessel that follows at least one other vessel operating in a seaway where the vessels are exposed to surge motion by the seaway waves. The present disclosure shares similarities with U.S. application Ser. No. 17/682,571, which is incorporated herein by reference in its entirety.

Attempts at reducing operating costs of vessels have continued to remain difficult. As such, there is a continued need for improved reduction of operating costs of vessels operating in the seaway.

For example, one continued problem with reducing wave making resistance of follower vessel(s) is that when operating in a seaway environment, water current relative to earth and/or sea waves, wind, or the like, can affect the lead vessel's trajectory, or the lead vessel may intentionally maneuver or unintentionally move in the seaway to diverge from a linear path, which these changes in direction by the lead vessel affect its Kelvin wake wave propagation direction. This change in lead vessel direction and resultant Kelvin wake wave propagation direction therefore will change the location at which to position the follower vessel(s) to reduce wave-making resistance according to such methods described in U.S. patent application Ser. No. 16/988,668 and/or U.S. patent application Ser. No. 17/682,571. This location at which to position the follower vessel(s) to reduce wave making resistance is referred to as a resistance reduction zone, and may include a longitude, latitude, and/or area/region relative to at least one Kelvin wake wave (e.g., at least one transverse wave) created by the lead vessel that will provide a reduction in wave-making resistance according to the foregoing previous disclosures.

A problem with the previous techniques, however, is that time-dependency of the Kelvin wake wave formation was not accounted for. Rather, aspect(s) of the previous techniques focused on the Kelvin wake wave formation of the lead vessel at its present time when calculating the reduction resistance zone(s) at which to position the follower vessel(s), and assumed that the Kelvin wake wave associated with where to position the follower vessel(s) was the same direction and wave pattern as the Kelvin wake wave being created at the present time of the lead vessel. While such an assumption is accurate when the lead vessel is traveling in a linear path at a constant velocity, it is not the most accurate assumption when the lead vessel diverges from its linear path, for example when the lead vessel is maneuvering in the seaway and/or has been moved off its path by seaway waves, wind, or the like; and/or when the lead vessel has changed its speed while traveling along its path. This is because the Kelvin wake wave associated with the reduction resistance zone at which to position the follower vessel(s) was generated in a particular direction and at a particular speed by the lead vessel at a previous time in the past, whereby the lead vessel surpassed this Kelvin wake wave and the follower vessel(s) have now caught up to this Kelvin wake wave. In the situation where the lead vessel has now veered off a linear path or has changed its speed, and the lead vessel's present heading and speed is used to determine where to position the follower vessel(s), then there is a discrepancy with the calculation using the direction and wave pattern of the presently generated Kelvin wake wave compared to the direction and wave pattern of the Kelvin wake wave generated in the past, which this past-generated Kelvin wake wave is the one that the follower vessel(s) are now approaching and is the one that should be used for determining the reduction resistance zone(s) at which to position the follower vessel(s). Therefore, it would be advantageous to use a time-dependent approach, based upon the location where the Kelvin wake waves were generated and their propagation speed and direction, for positioning the follower vessel(s) in the reduction resistance zone(s) in the Kelvin wake wave(s) of the lead vessel(s). At least one aspect of the present disclosure solves one or more problems of previous techniques by providing a system and/or method that reduces wave-making resistance of at least one follower vessel following at least one lead vessel operating in a seaway based on a time-dependent approach for positioning the follower vessel(s) in one or more wave-making reduction resistance zone(s) associated with the Kelvin wake wave(s) generated by the lead vessel(s). Such a time-dependent approach may be based at least in part upon a calculation of data associated with the state of the Kelvin wake wave(s) of the lead vessel(s) at a time after the Kelvin wake wave(s) is/are generated, so as to position the follower vessel(s) in the wave-making reduction resistance zone(s) at that later time. Such a time-dependent approach, therefore, can account for variations in the state of the lead vessel(s) when operating in a seaway, for example to account for variations in the heading, speed, or the like of the lead vessel(s).

An aspect of the present disclosure provides a system and method of determining the propagation and position of a vessel's Kelvin wake waves when operating in a seaway environment including a water current and/or sea waves and/or wind (referred to as external forces).

An aspect of the present disclosure provides a system and method of determining the propagation and position of a vessel's Kelvin wake waves when a vessel's lateral and/or directional motion occurs due to a vessel's lateral and/or directional instability and/or the vessels response to a controlled maneuver (referred to as control forces).

An aspect of the present disclosure provides a system and method of determining the time-dependent track of a specified location within the Kelvin wake where the specified location is referenced to as a resistance reduction zone and/or referenced to a specific location at a specific time on a specified transverse wave.

An aspect of the present disclosure provides a system and method of determining the time-dependent track of a specified location within the Kelvin wake when the vessels course is perturbed by external and/or control forces where the specified location is referenced to a resistance reduction zone and/or referenced to a specific location at a specific time on a specified transverse wave.

An aspect of the present disclosure provides a system and method of positioning vessel(s) following a lead vessel(s) in alignment with the time-dependent position or track to substantially reduced wave-making resistance across the vessels' entire speed regime and throughout its operational seaway environment resulting in a reduction in propulsion power and fuel used, over the vessel's entire operational domain.

An aspect of the present disclosure provides a system and method of operating multiple marine vessels that are either manned or unmanned in a seaway, with substantially reduced wave-making resistance across the vessels' entire speed regime and throughout its operational seaway environment when in alignment with the time-dependent position or track.

An aspect of the present disclosure provides a system and method of determining the positions of multiple marine vessels with substantially reduced wave-making resistance that are operating in seaway environment.

An aspect of the present disclosure provides a system processor and/or controller that defines each vessel's Kelvin wake time-dependent position or track and the location of zones along the time-dependent position or track where wave-making resistance reduction of follower vessels within that Kelvin wake occurs.

An aspect of the present disclosure provides a system processor and/or controller that provides the information for the operator of a manned vessel to control the locations of a vessel along the time-dependent location or track in a defined formation in a significant seaway.

An aspect of the present disclosure enables the computation of the positions of the lead vessel(s) and/or follower vessel(s) in a spatially-dependent manner relative to each other, and/or enables the computation of the locations of the lead vessel(s) and/or the follower vessel(s) in a spatially-independent manner relative to each other (e.g., a global positioning (GPS) of each vessel according to the Earth's coordinate system in the seaway).

An aspect of the present disclosure enables the computation of the position of a vessel along the time-dependent track in a defined formation to be performed by a remote-based computer system that contains the necessary database information and algorithms and where a means is available to communicate the positions to the subject vessels and wherein the remote-based computer system can simultaneously perform these calculations for multiple collaborative fleets. Such a superordinate command system controller would reduce costs of multiple controllers onboard individual vessels.

An aspect of the present disclosure provides an onboard system processor and/or controller on a vessel, such as the lead vessel, which can calculate positions for one or more vessels in multiple collaborative fleets. The vessel with the processor and/or controller does not necessarily need to be a vessel within the collaborative fleet.

An aspect of the present disclosure provides an algorithm that calculates the time dependent location (e.g., GPS latitude and longitude) for the follower vessel(s) that accounts for perturbations to the lead vessel's speed, water axis heading and position (e.g., GPS). In exemplary embodiments, the algorithm calculation process uses time referenced sensor measurements including location (e.g., GPS for global position), time (e.g., GPS system time for time reference), a water direction and speed sensor for water axis heading and speed. The Kelvin wake wave's propagation speed and direction from the point at which they are created may be calculated using wave theory for gravitational water waves. The propagation distance may use computational fluid dynamic (CFD) calculations for the distance from where the Kelvin wake waves are created to where a significant reduction in wave-making resistance occurs (identified as specific points and/or zones, referred to as reduction resistance zone(s)). Output from the algorithm may be a time continuous (every second or less) location (e.g., GPS) used to command the follower vessel's speed and heading to maintain the optimum wave-making resistance reduction.

According to an aspect, fleet arrangements using multiple follower vessels uses a CFD overlay process according to the system and methods described in U.S. Ser. No. 16/988,668 and/or U.S. Ser. No. 17/682,571, along with the algorithm/system/method according to the present disclosure to account for perturbations in the lead vessel's heading and/or speed, to determine the optimum wave-making resistance reduction for all fleet vessels.

According to an aspect, a system for reducing wave-making resistance of at least one follower vessel following at least one lead vessel operating in a seaway, the system including at least one electronic processor configured to: determine at least a direction and speed of at least one first Kelvin wake transverse wave generated by the at least one lead vessel, wherein the at least one first Kelvin wake transverse wave is generated by the at least one lead vessel at a first time and propagates in the seaway until at least a second time subsequent to the first time; based at least upon the direction and speed of the at least one first Kelvin wake transverse wave propagating in the seaway from the first time to the second time, determine one or more locations in at least one reduced wave-making resistance region at which to position the at least one follower vessel when the at least one follower vessel and the at least one first Kelvin wake transverse wave are at the second time, wherein the at least one reduced wave-making resistance region is a region in the seaway associated with the at least one first Kelvin wake transverse wave that, when occupied by the at least one follower vessel, reduces the wave-making resistance of the at least one follower vessel by providing destructive cancelation with the at least one first Kelvin wake transverse wave; and output information associated with the determined one or more locations at which to position the at least one follower vessel in the at least one reduced wave-making resistance region associated with the at least one first Kelvin wake transverse wave corresponding to the second time to thereby reduce the wave-making resistance of the at least one follower vessel when at the second time.

According to an aspect, a non-transitory computer readable medium storing program code (e.g., software), which when executed by one or more processors, performs at least the steps including: determining at least a direction and speed of at least one first Kelvin wake transverse wave generated by the at least one lead vessel, wherein the at least one first Kelvin wake transverse wave is generated by the at least one lead vessel at a first time and propagates in the seaway until at least a second time subsequent to the first time; based at least upon the direction and speed of the at least one first Kelvin wake transverse wave propagating in the seaway from the first time to the second time, determining one or more locations in at least one reduced wave-making resistance region at which to position the at least one follower vessel when the at least one follower vessel and the at least one first Kelvin wake transverse wave are at the second time, wherein the at least one reduced wave-making resistance region is a region in the seaway associated with the at least one first Kelvin wake transverse wave that, when occupied by the at least one follower vessel, reduces the wave-making resistance of the at least one follower vessel by providing destructive cancelation with the at least one first Kelvin wake transverse wave; and outputting information associated with the determined one or more locations at which to position the at least one follower vessel in the at least one reduced wave-making resistance region associated with the at least one first Kelvin wake transverse wave corresponding to the second time to thereby reduce the wave-making resistance of the at least one follower vessel when at the second time.

According to an aspect, a method for reducing wave-making resistance of at least one follower vessel following at least one lead vessel operating in a seaway over a period of time, the method including: determining at least a direction and speed of at least one first Kelvin wake transverse wave generated by the at least one lead vessel, wherein the at least one first Kelvin wake transverse wave is generated by the at least one lead vessel at a first time and propagates in the seaway until at least a second time subsequent to the first time; based at least upon the direction and speed of the at least one first Kelvin wake transverse wave propagating in the seaway from the first time to the second time, determining one or more locations in at least one reduced wave-making resistance region at which to position the at least one follower vessel when the at least one follower vessel and the at least one first Kelvin wake transverse wave are at the second time, wherein the at least one reduced wave-making resistance region is a region in the seaway associated with the at least one first Kelvin wake transverse wave that, when occupied by the at least one follower vessel, reduces the wave-making resistance of the at least one follower vessel by providing destructive cancelation with the at least one first Kelvin wake transverse wave; and outputting information associated with the determined one or more locations at which to position the at least one follower vessel in the at least one reduced wave-making resistance region associated with the at least one first Kelvin wake transverse wave corresponding to the second time to thereby reduce the wave-making resistance of the at least one follower vessel when at the second time.

Exemplary embodiment(s) may include the foregoing process(es) being at least part of a sequence, and the processor(s), controller(s), method and/or software is configured to repeat the sequence at continuous or intermittent time intervals to continuously or intermittently track the at least one lead vessel and continuously or intermittently define the position and/or enable the control of the at least one follower vessel at the at least one reduced wave-making resistance region associated with the Kelvin wake wave created by the at least one lead vessel at the first time preceding a subsequent second time in which the at least one lead vessel has advanced beyond the previously created Kelvin wake wave.

Exemplary embodiment(s) may include the foregoing exemplary system, method, or software that further accounts for seaway-induced vessel motion data according to U.S. Ser. No. 17/682,571.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
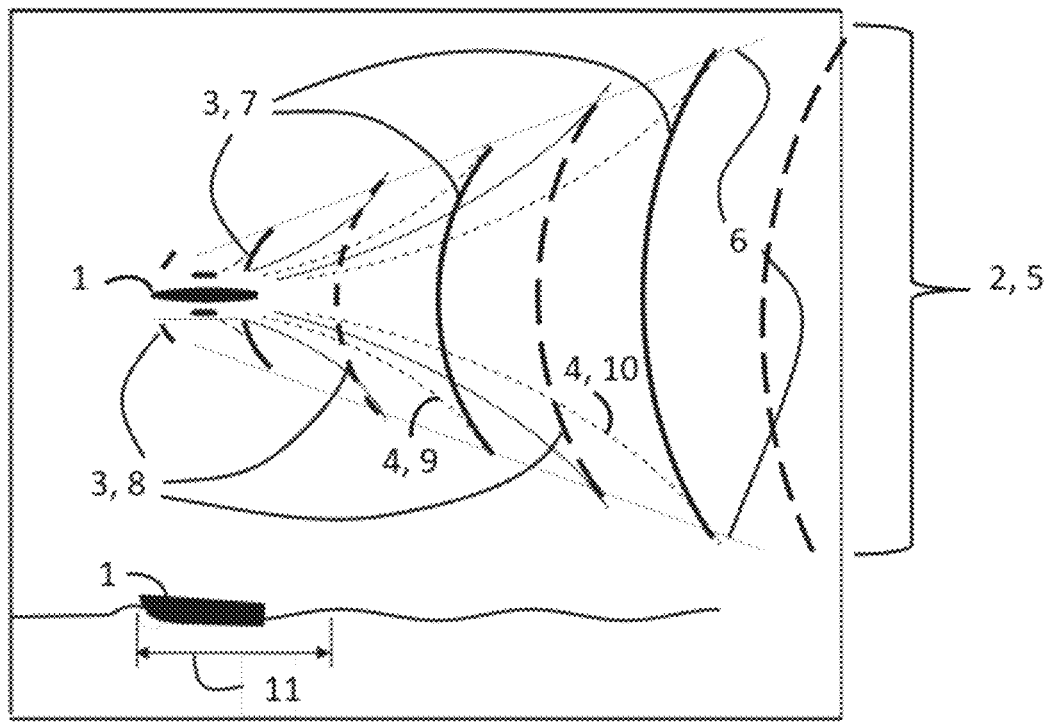
FIG. 1 illustrates a schematic plan and elevational view of a Kelvin wake for a marine vessel.

The present disclosure has particular application to a fleet of vessels operating in seaway, and will be described below chiefly in this context. A seaway, which may be defined as any navigable body of water having a surface that waves form thereon (e.g., oceans, seas, large lakes, etc.), and which may allow a vessel to perform various actions, such as, for example, transportation of goods from one point to another. Accordingly, a vessel may be defined as any vessel that may navigate the seaway, including any suitable watercraft, such as ships, boats, floating vessels, displacement vessels, or the like. A fleet includes two or more such vessels, one or more of which may be the same as each other or different from each other. A lead vessel in the fleet is one that produces a Kelvin wake, and a follower or following vessel is one that follows the lead vessel within the lead vessel's Kelvin wake. There may be multiple lead vessels and multiple follower vessels in a fleet, and there may be other vessels within the fleet that are neither lead nor follower vessels. The lead vessel may become the follower vessel, and the follower vessel may become the lead vessel.

Many factors may affect operational costs of vessels operating in the seaway, such as, for example, fuel consumption costs. As stated above, at least one exemplary factors that may affect fuel consumption costs may include wave-making resistance of vessels. Another factor may include seaway-induced vessel motions caused by seaway waves. As such, reducing positioning control requirements for maintaining reduced wave-making resistance of vessels may be beneficial.

An aspect of the present disclosure provides two or more marine vessels controlled to operate independently, aggregate into a controlled formation, operate in a coordinated and controlled manner, along the direction of travel, and disaggregate to independent controlled operation. By using two or more vessels creating comparable Kelvin-wake patterns, at least some (and more particularly a preponderance) of the wave-making resistance can be cancelled by positioning the vessels such that the Kelvin wake's transverse wave and/or divergent waves produced by the vessels are out of phase and at least partially (e.g., predominantly) destructively cancel each other when operating in the positionally controlled formation, referred to herein as a collaborative fleet. Such a region is referred to herein as a reduced wave-making resistance region (also resistance reduction region, or the like), which is a region in the seaway that, when occupied by the at least one follower vessel, at least partially (e.g., predominantly) destructively cancels at least one periodic wave pattern of a Kelvin wake wave generated by the at least one follower vessel, for reducing the wave-making resistance of the at least one follower vessel. Vessels comprising the collaborative fleet formation are referred to as the "Lead Vessel" and the "Follower Vessel," as described above.

Figure 4:
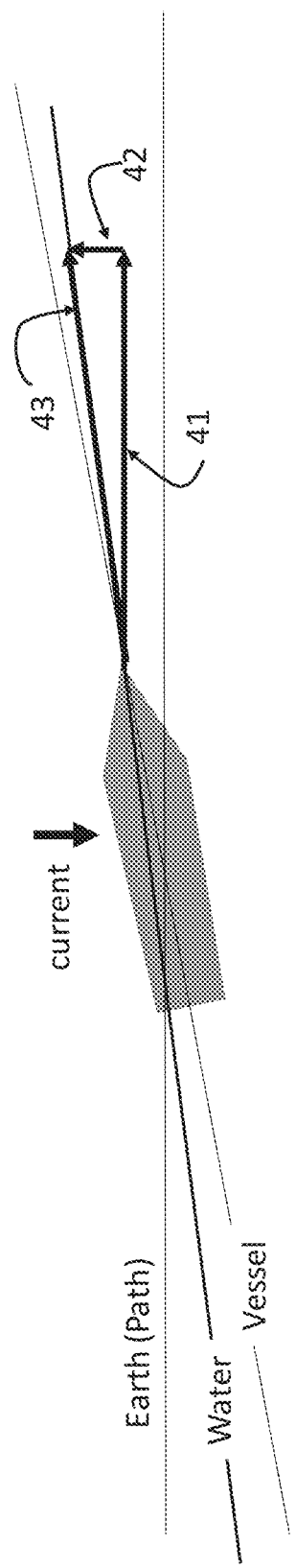
FIG. 4 illustrates a reference frame axes systems comprised of a vessel water axis reference frame, an Earth axis reference frame, and a vessel axis reference frame.

Kelvin wake waves are created by a vessel's motion through the water. The direction in which these waves propagate is dependent upon the vessel's direction through the water which is referred to as the water axis reference frame. Two additional axis system reference frames are also used in defining the vessel's operations; an earth axis reference frame system which may be either a flat earth or geo-earth (spherical) system is used to define the vessel's path over the ground and a vessel axis reference frame system is used as the frame of reference for seaway and vessel generated forces and moments and resulting motions, as shown in FIG. 4, for example. When operating in calm water at a constant heading all three axis system reference frames are aligned. Operating in a seaway where the vessel encounters external wave and current forces that perturb the vessel's heading results in changes the alignment orientation of the reference frames.

The Kelvin wake waves propagation (speed and direction) is defined by the vessels speed and direction through the water at the time the waves are created. For example, the Kelvin wake's transverse wave will propagate in the water axis direction at the vessel's water axis speed. Once created, the Kelvin wake waves do not change their speed or direction. When a vessel's heading changes the Kelvin wake waves that are being generated will propagate aligned with the change in water axis heading. When a vessel's speed changes the Kelvin wake waves that are being generated will propagate at a speed as structured by the vessel's new speed.

When operating in a seaway that perturbs a lead vessel's path, the time dependent position or track of the optimal resistance reduction zones is used to optimally position a follower vessel in the lead vessel's Kelvin wake wave that was created in the past. The optimal resistance reduction zones' positional locations may be initially determined by using computational fluid dynamics codes that can determine the wave-making resistance of at least two independent vessels. The propagations of these zones are positioned relative to the location where the Kelvin wake waves were when they were generated using wave propagation wave theory (e.g., gravity wave theory propagation). A time dependent track of each reduction zone defines the multiple optimal paths for the follower vessel as it follows the track of the lead vessel so as to account for variations in the state (e.g., heading and/or speed) of the lead vessel.

The present disclosure may utilize wave theory (e.g., gravitational wave theory) for calculating the propagation of water waves within the Kelvin wake along with data obtained from either/and/or CFD analyses, scale model hydrodynamic testing, full scale trials and measurements of vessel performance when underway to determine the positional arrangement and global position to reduce the wave-making resistance for at least one or multiple vessels when operating within a fleet. Such wave propagation calculation may be based on a deep-water assumption. The Vessel Positioning Algorithm of the present disclosure may process the information to determine the positional arrangement to reduce the wave-making resistance of Follower vessel(s), as described in further detail below.

According to the present disclosure, the Vessel Positioning Algorithm may enable the computation of where to position the follower vessel(s) in the reduced wave-making resistance zone(s) in a spatially-dependent manner relative to the position of the lead vessel(s) and/or in a spatially-independent manner relative to the lead vessel(s). Such spatially-dependent positioning may include a spatially-dependent track relative to a path of the lead vessel(s). The spatially-dependent positioning may be particularly beneficial for small heading changes of the lead vessel or where GPS is unavailable. The spatially-independent positioning may include a global positioning (GPS) of the follower vessel(s) in the seaway independent of the location of the lead vessel. Such GPS positioning may include a longitude and latitude in the Earth's coordinate system, and may be particularly beneficial for large variations in heading changes of the lead vessel. Such spatially-independent positioning may include a spatially-independent track along a path according to the Earth's coordinate system independent of the lead vessel path. Accordingly, as used herein, the term "position" or "positionally" may refer to a spatially-dependent or a spatially-independent positioning and the term "location" refers to a spatially-independent positioning unless otherwise stated.

To reduce wave-making resistance, the techniques of the present disclosure may define Kelvin wake wave-making resistance reduction regions. Two exemplary distinct features of a Kelvin wake may include transverse waves and divergent waves. Transverse waves may be defined as waves traveling roughly perpendicular to a vessel's track (i.e., propagating parallel to the vessel's track). The transverse waves may be observed extending across an otherwise relatively calm area between sides of a wake. The transverse waves may always be contained within a Kelvin Wake angle and may always reach an outer boundary of the Kelvin wake angle. Divergent waves may be defined as waves traveling diagonally outwards relative to the vessel's track. The divergent waves may be observed as a wake of a vessel with a series of diagonal or oblique crests moving at an angle to the vessel's track. The wake pattern may be strongly dependent upon a Froude number (Fr) where $Fr=v/(g*l)^{0.5}$ and where v is the vessel's speed, g is acceleration due to gravity, and l is a waterline length of the vessel.

FIG. 1 illustrates a plan view and an elevation view of a vessel 1 and its Kelvin wake 2 while traveling at a primary hump speed. The Kelvin wake 2 may include transverse waves 3 and divergent waves 4. The transverse waves of the Kelvin wake may be observable as large periodic waves within a V-pattern 5 and within a Kelvin angle 6. The transverse waves may include transverse wave troughs 7 (solid lines) and transverse wave crests 8 (dashed lines). FIG. 1 further illustrates a wavelength 11 of the transverse waves 3. The divergent waves 4 may include divergent wave troughs 9 (solid lines) and divergent wave crests 10 (dashed lines). Generally, each transverse wave 3 is a singular wave that propagates according to the speed of the vessel 1 when generated by the vessel 1, and all other waves that are generated (all frequencies) are divergent waves 4 that cannot keep up with such speed and diverge outwardly.

Figure 2:
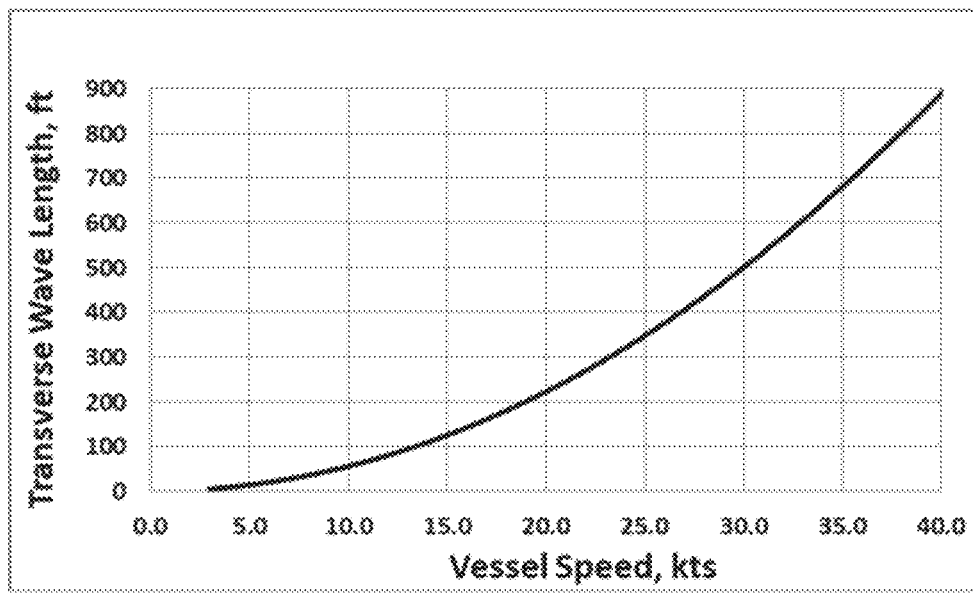
FIG. 2 illustrates a graph of transverse wavelength in feet (ft) versus vessel speed in knots (kts).

FIG. 2 illustrates a graph of transverse wavelength in feet (ft) versus vessel speed in knots (kts). The vessel's transverse wave's wavelength, which may be determined by the vessel's speed, may be expressed by $\Delta=2\pi v^2/g$ (where A is the transverse wavelength, v is the vessel speed and g is the acceleration due to gravity). As such, a direct relationship may exist between a vessel's speed and the vessel's transverse wave's wavelength.

Figure 3A:
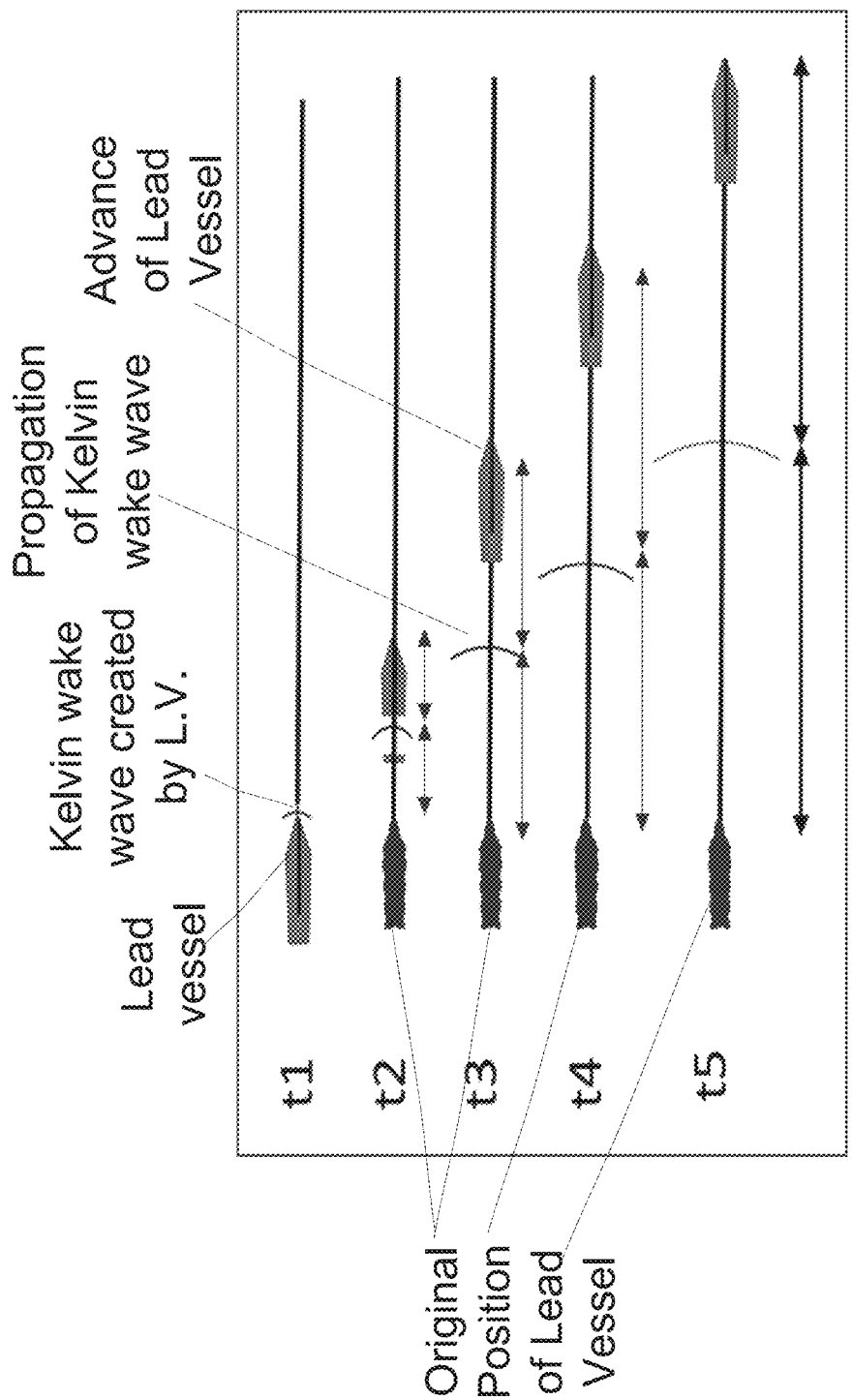
FIG. 3A illustrates the formation of a Kelvin wake wave (e.g., a transverse wave) by a lead vessel at an initial time (t1) and the advance of the lead vessel at subsequent times along with the propagation of the Kelvin wake wave at the subsequent times.

FIG. 3A illustrates the formation of a Kelvin wake wave (e.g., a transverse wave) by a lead vessel at an initial time (t1) and the advance of the lead vessel at subsequent times (t2-t5) along with the propagation of the Kelvin wake transverse wave at the subsequent times. The Kelvin wake transverse wave was created at t1 and the lead vessel surpasses this Kelvin wake wave at the start. The Kelvin wake transverse wave is shown in t2-t5 at positions to where the wave has propagated to halfway between where the vessel was at time t1 and where it is at t2, t3, t4, etc. In exemplary embodiments, the follower vessel (not shown in this diagram) is positioned at a reduced wave-making reduction region associated with the Kelvin wake transverse wave at time/position t5 which is selected so the follower vessel is not too close to the lead vessel and is not too far away (resistance reduction).

Figure 3B:
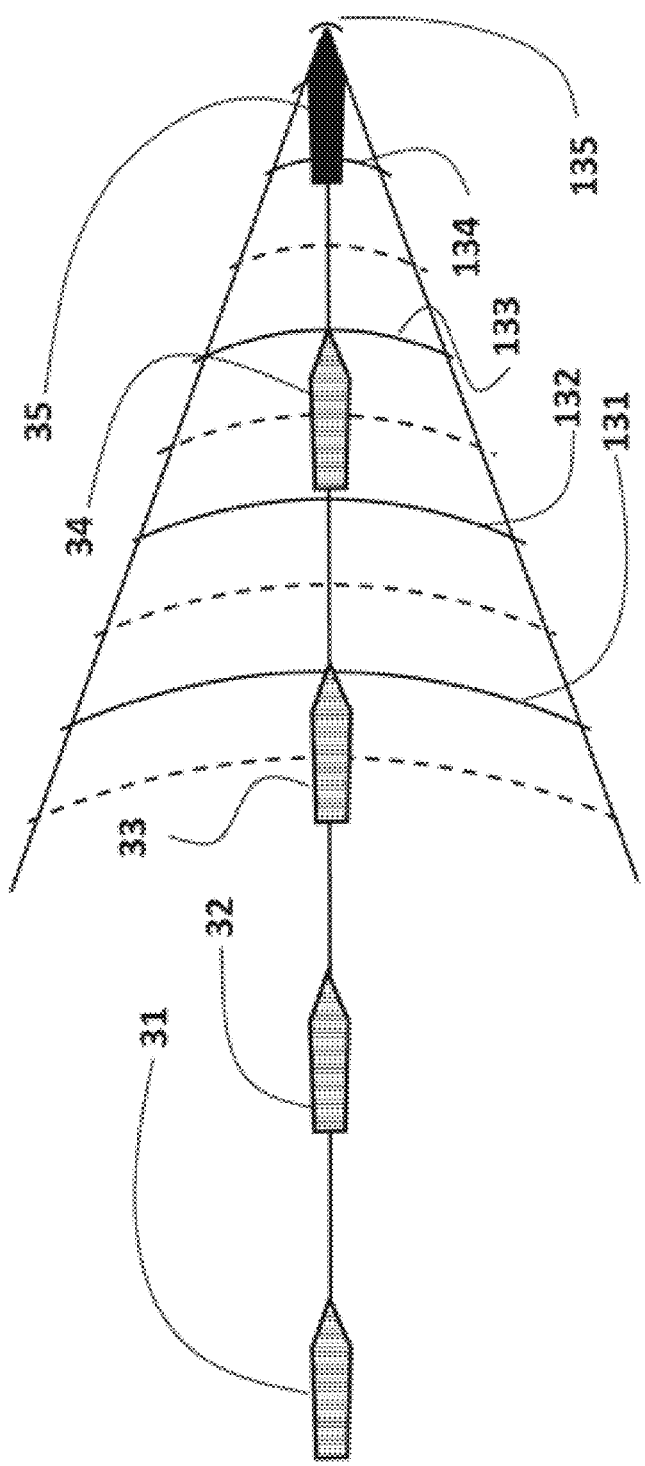
FIG. 3B illustrates a vessel's location when generating Kelvin wake waves.

FIG. 3B is similar to FIG. 3A, and shows the locations of a vessel when it generated the waves observed in the Kelvin wake wave field. The vessel 35 represents the vessel's current location. Vessel images 31, 32, 33, 34 represent previous locations of the vessel as it travels along a straight path. Vessel 35 is creating the bow transverse wave crest 135 at the forward position in the Kelvin wake. The transverse wave crest 134 was created when the vessel was in the position 34. Transverse wave crests 133, 132, and 131 were created by the vessel when in positions 33, 32, and 31 respectively. Note in this exemplary illustration that each transverse crest 135, 134, 133, 132, and 131 is located at a position halfway between the current vessel's bow location 35 and where the vessel's bow was when the transverse wave crests were created 35, 34, 33, 32, 31.

FIG. 4 shows three axis system reference frames: an earth axis reference frame system which may be either a flat earth or geo-earth (spherical) system is used to define the vessel's path over the ground; a vessel axis reference frame system used as the frame of reference for seaway and vessel generated forces and moments and resulting motions; and water axis reference frame that is aligned with the vessels path through the water that defines the speed through the water 43 and direction in which the Kelvin wake waves are created and propagate. When operating in calm water at a constant heading all three axis system reference frames and the speed through the water 43 are aligned. When operating in a seaway where the vessel encounters wind, wave and current forces that impose a velocity 42 apart from the vessel's earth path water speed 41 a change in the alignment orientation of the reference frames and resultant water axis heading and speed 43 occurs. Additionally, a vessel's lateral/directional maneuvers will result in changes in the alignment of the reference frames.

The sequence of illustrations in FIGS. 5-15 depict exemplary process steps according to embodiment(s) of the present disclosure that may be used for providing a time-dependent approach for positioning one or more follower vessel(s) in one or more wave-making reduction resistance zone(s) associated with the Kelvin wake wave(s) generated by one or more lead vessel(s) for reducing the wave making resistance of the follower vessel(s). Such a process may be used to account for variations in the state of the lead vessel(s) when operating in a seaway, for example to account for variations in the heading and/or speed of the lead vessel(s). It is understood that although these figures are shown in a particular sequence, which may be denoted as processing blocks for a particular algorithm, the sequence of events could be different, additional step(s) could be added, or some sequence(s) could be omitted as would be understood by those having ordinary skill in the art.

Figure 5:
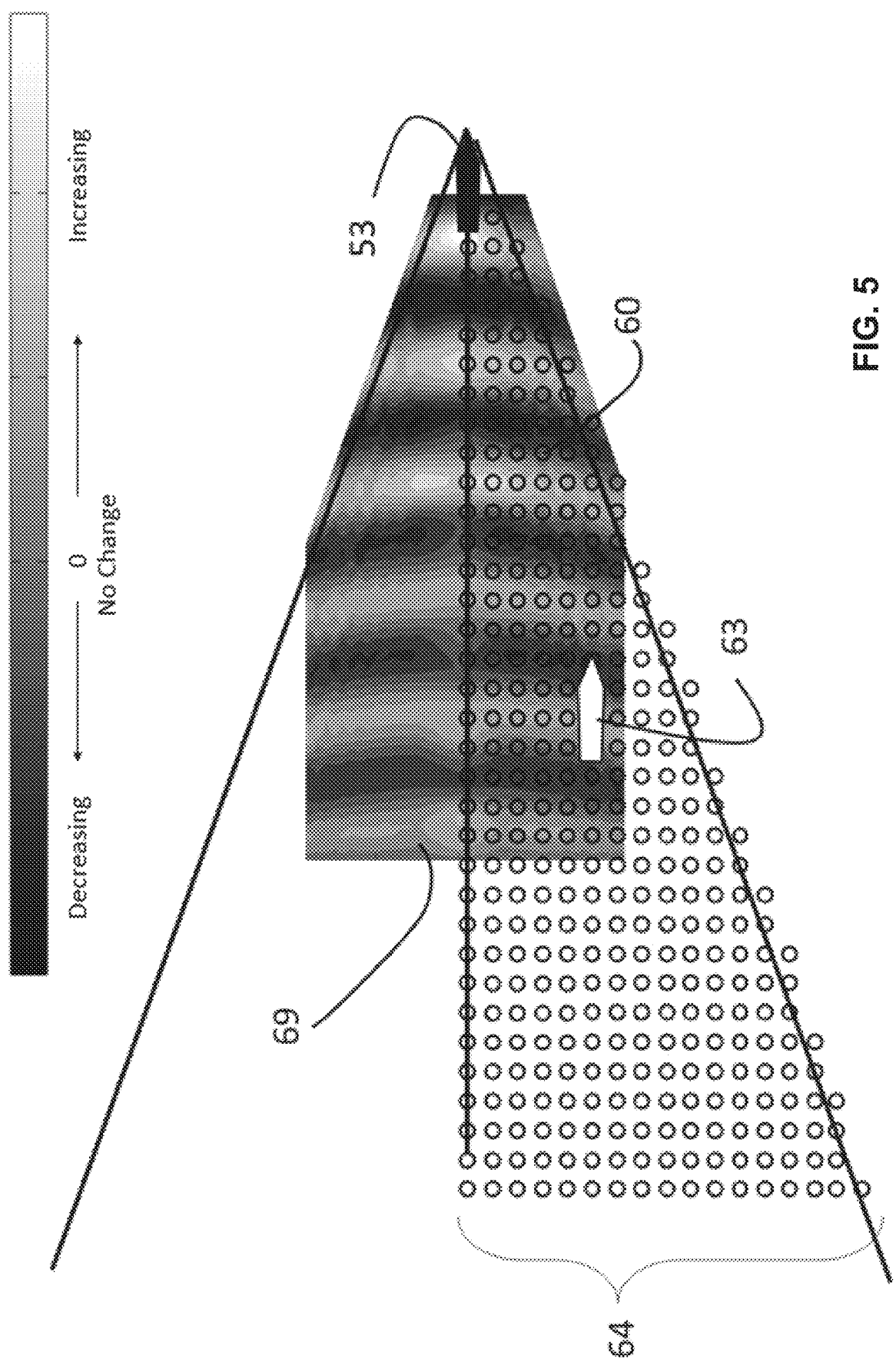
FIG. 5 illustrates computational fluid dynamic (CFD) mapping and means for determining optimum wave-making resistance reduction arrangement for vessel pairs.

FIG. 5 shows a process for determining and mapping the wave-making resistance regions for a follower vessel 63 that is operating within the Kelvin wake of a lead vessel 53. As shown, the wave making resistance map is a simulation that can calculate the wave-making resistance for each vessel of a vessel pair 53, 63 and calculates the wave-making resistance for the second vessel 63 at numerous locations 60 within the Kelvin wake field 64. Such a wave making resistance map may be created by any suitable technique, including, but not limited to, computational fluid dynamic (CFD) modeling techniques. Such a wave making resistance map may be displayed to a suitable display, which may be onboard the follower vessel 63, and/or which may be remote for remotely controlling the follower vessel 63, to position the follower vessel 63 at an optimal wave-making resistance region according to the calculation.

In exemplary embodiments, the calculation to determine the wave making resistance regions includes determining at least one periodic wave pattern (e.g., frequency) of at least one Kelvin wake wave generated by the lead vessel 53, and then determining where to position the follower vessel 63 such that the Kelvin wake wave(s) generated by the follower vessel 63 are at least partially destructively cancelled by the lead vessel's Kelvin wake wave(s). Such destructive cancelation may include destructive cancelation of transverse wave(s), diverging waves, or a combination of both. The destructive cancelation may be a predominant destructive cancelation (i.e., 50% or more). In determining the periodic wave pattern(s) of the Kelvin wake wave(s) of the lead vessel 53 for calculating the wave making resistance regions, the system may utilize one or more variables, such as the speed of the lead vessel 53, the geometry of the lead vessel 53 (e.g., waterline length), or the like. Such variables also may be used for determining the periodic wave pattern(s) of the Kelvin wake wave(s) of the follower vessel 63 to determine which positions of the follower vessel 63 provide a greater or lesser degree of destructive cancelation with the lead vessel's Kelvin wake wave(s) to determine regions associated with greater or lesser wave-making resistance. Generally, in determining where to position the follower vessel 63 to provide destructive cancelation with the lead vessel's Kelvin wake wave(s), the follower vessel 63 may be positioned such that crests of the Kelvin wake wave of the lead vessel 53 are aligned with troughs of the Kelvin wake wave of the follower vessel 63, and such that troughs of the Kelvin wake wave of the lead vessel 53 are aligned with crests of the at Kelvin wake wave of follower vessel 63. Such alignment may be achieved by positioning the bow of the follower vessel 63 at the troughs of the Kelvin wake wave of the lead vessel 53, for example.

The general technique of determining reduced wave-making resistance positions of the follower vessel via destructive cancelation of the Kelvin wake wave(s) is described in U.S. Ser. No. 16/988,668. However, to provide greater detail so as to map the magnitude of such wave-making resistance at the various positions within the lead vessel's 53 Kelvin wake field 64, the exemplary process according to the present disclosure may account for most or all Kelvin wake waves generated by the lead vessel 53, including the transverse wave(s) and diverging waves, their respective frequencies, and the interactions between these waves. For example, such interactions may be used to determine one or more angles along the Kelvin wake transverse waves that include one or more reduced wave making resistance regions having the greatest energy (e.g., greatest wave amplitude) compared to other regions along the first Kelvin wake transverse wave, which such high-energy regions also may provide the greatest destructive cancelation and therefore may provide the greatest reduction in wave-making resistance. Such increases or decreases in the wave-making resistance is represented in FIG. 5 via the dark and light regions, wherein the dark regions are associated with decreased wave-making resistance and the light regions are associated with greater wave-making resistance. As represented in FIG. 5, and also noted above in connection with FIG. 1B, the regions along the Kelvin wake transverse waves associated with the greatest energy and thus greatest reduced wave making resistance regions may diverge outwardly toward a cusp of the Kelvin wake of the lead vessel as the speed of the lead vessel increases.

Furthermore, so as to provide greater detail for the map and determine the reduced wave-making regions at which to position the follower vessel 63, the exemplary technique simulates the location of the follower vessel 63 at multiple locations 60 within the field 64 so as to determine magnitudes of resistance (e.g., via energy, pressure resistance, or the like) at the multiple locations 60. The resistance reduction of this follower vessel 63 is then calculated by comparing the resistance, R2, of the vessel when operating in the following position 63, with the resistance, R1, of the vessel when operating in the lead position 53, whereby the resistance reduction=R1−R2. The number of locations 60 where the wave-making resistance is calculated should be sufficient to map the wave-making resistance 69 for the area within the Kelvin wake by interpolating for the resistance values between the CFD-calculated locations.

It should be understood that such a process of generating a wave-making resistance map as shown in FIG. 5 may be data-intense and therefore may demand significant processing power. As such, according to exemplary embodiments, such wave-making resistance maps may be preprocessed and stored in non-transitory memory for retrieval by the at least one processor according to the present disclosure for determining where to position the follower vessel(s) 63 based on the time-dependent approach described herein. As is understood according to the present disclosure, the wave-making resistance pattern in the map (such as that shown in FIG. 5) may change based on the speed of the vessels 53, 63, and also may change based on the geometry (e.g., waterline length) of the vessels 53, 63. Therefore, according to at least one approach of the present disclosure, different wave-making resistance maps can be pre-generated and stored for different speeds or geometries, such as for each type of lead vessel/following vessel pair 53, 63, and for different discrete speeds of the pair 53, 63 (e.g., 5 knots, 10 knots, 15 knots, etc.). In this manner, as the speed of the actual vessel pair 53, 63 operating in the seaway changes speed, a different wave-making resistance map may be loaded and displayed according to such speed. It is of course understood that, provided sufficient processing power is available, such calculations and generation of the wave-making resistance map(s) could be done in real-time based on the actual speeds, etc. of the vessels operating in the coordinated fleet.

Figure 6:
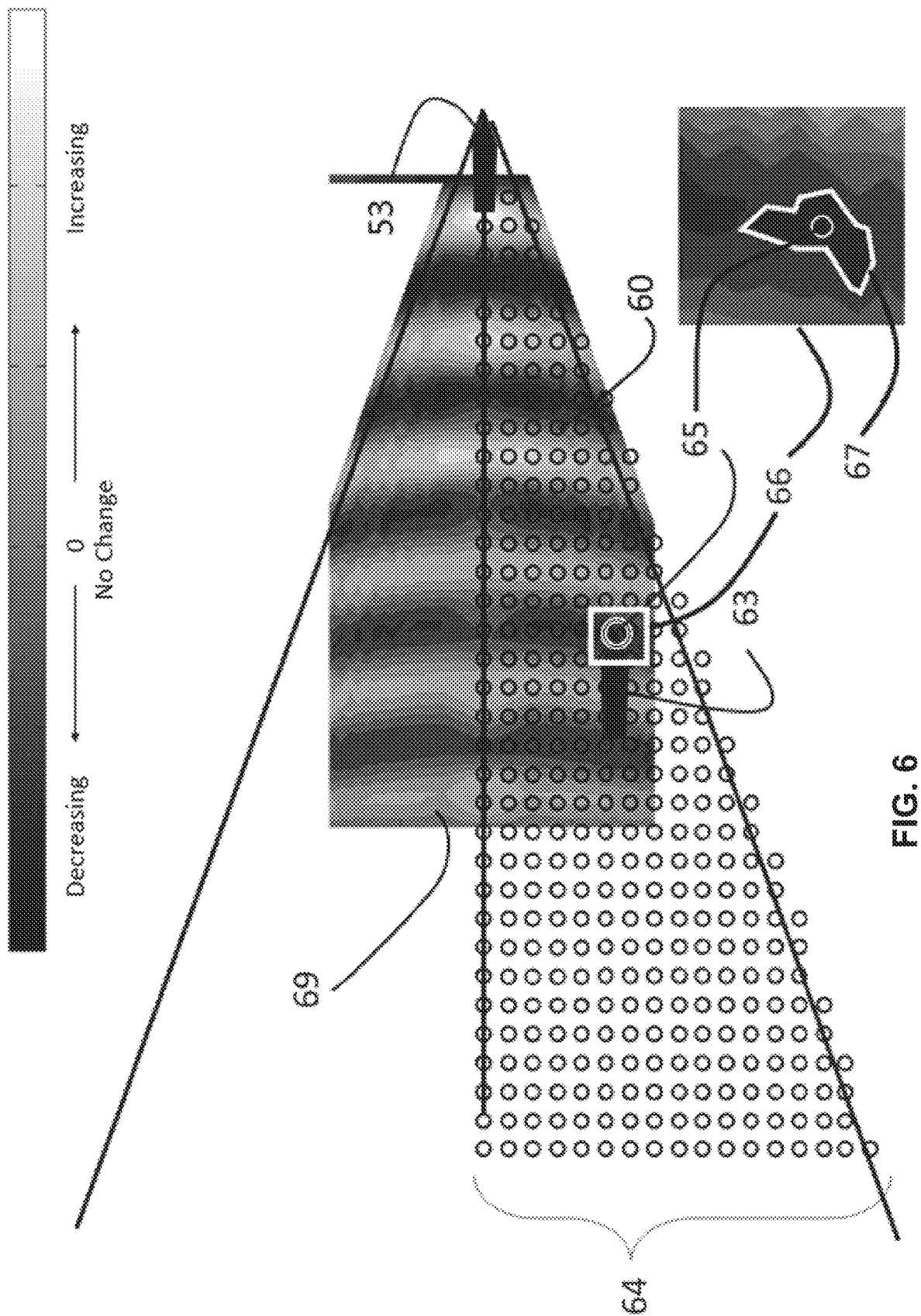
FIG. 6 illustrates an exemplary means for determining wave-making reduction resistance zones surrounding optimal wave-making reduction location.

FIG. 6 shows a wave-making resistance map process according to the process of FIG. 5 that may be used to determine one or more optimum resistance reduction locations for the follower vessel 63. Such process may include the Kelvin wake's mapped wave-making resistance 69 of FIG. 5 being searched for locations where the greatest wave-making resistance reduction occurs 65. Similarly to FIG. 5, in the illustration of FIG. 6 the dark regions in the Kelvin wake's mapped wave-making resistance 69 represents greater wave-making resistance reduction and the light regions represent increases in wave-making resistance of the follower vessel 63. As noted above, the speed of the lead vessel can affect the shape of the wave making resistance map pattern, and the Froude number may affect the distribution of the resistance reduction magnitudes within the resistance map pattern. Accordingly, as Froude number increases, the regions associated with the largest reduction may diverge outwardly toward the cusp as the predominant energy migrates from transverse waves to divergent waves, as shown on the map.

As shown in FIG. 6, multiple high-resistance reduction locations may be identified within the Kelvin wake region. A region around each location 65 is then examined to define a zone 67 (resistance reduction region) where a significant reduction of resistance (for example, nominally at least 80% of the greatest resistance reduction) is attained when compared to a point in location 65. By identifying such a zone 67, the positional control requirements for maintaining the follower vessel 63 in this region may be reduced as compared to a process of maintaining the follower vessel 63 at a narrow point or other small region around location 66. As such, defining such a zone 67 and reducing the positional control requirements can improve fuel savings, reduce computational power, or the like. It is furthermore noted that an optimally selected wave-making reduction zone or region might not necessarily be the region having the greatest wave-making resistance reduction; rather, other factors may be taken into account. For example, a zone having a high-degree of wave-making resistance reduction (e.g., 70%, for example) may be selected if such zone is at a safer distance (e.g., one, two or more transverse wavelengths back) relative to the lead vessel 53 (or other vessels) as compared to a zone having greater resistance reduction (e.g., 85%) but which is at lesser safe distance. Alternatively or additionally, a zone with a greater area but lesser resistance reduction may be selected in preference to a zone with a smaller area and greater resistance reduction, since the larger zone may have less positional control requirements for maintaining the follower vessel 63 in the selected zone.

Figure 7:
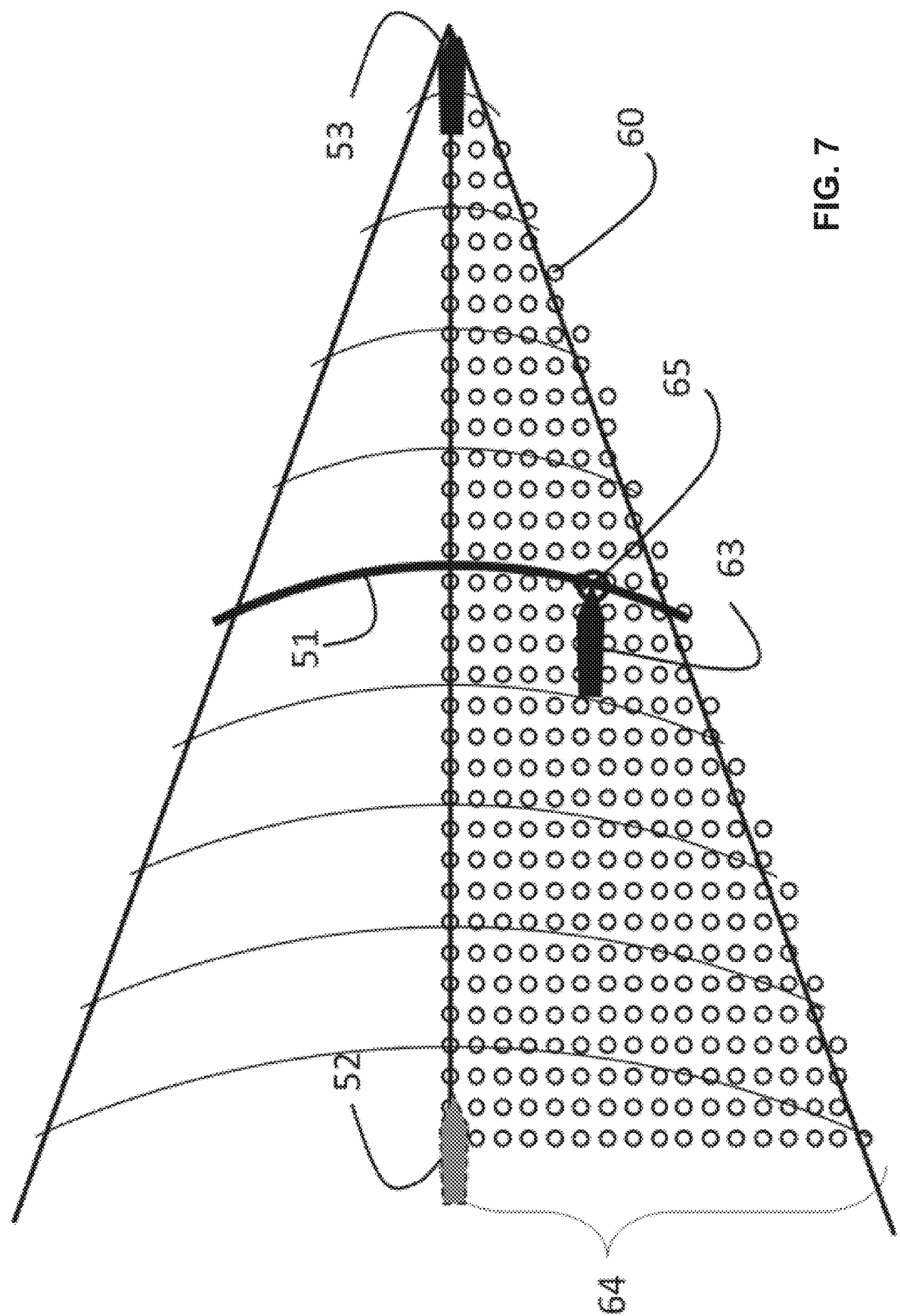
FIG. 7 illustrates position of the leading vessel when the Kelvin wake transverse wave and optimum wave-making resistance reduction location was created.

FIG. 7 shows transverse wave troughs within the lead vessel's 53 Kelvin wake. A follower vessel 63 is positioned with its bow along a transverse wave trough 51 at a wave-making resistance reduction location 65 (or associated zone 67) as identified by the process as described and shown in FIG. 6. Based at least upon a heading of the lead vessel's position 52 at a first time when the Kelvin wake transverse wave 51 is generated, the selected transverse wave 51 can then projected/tracked according to the exemplary algorithm for determining a location of the transverse wave 51 at a second subsequent time when the follower vessel 63 reaches this transverse wave 51.

Figure 8:
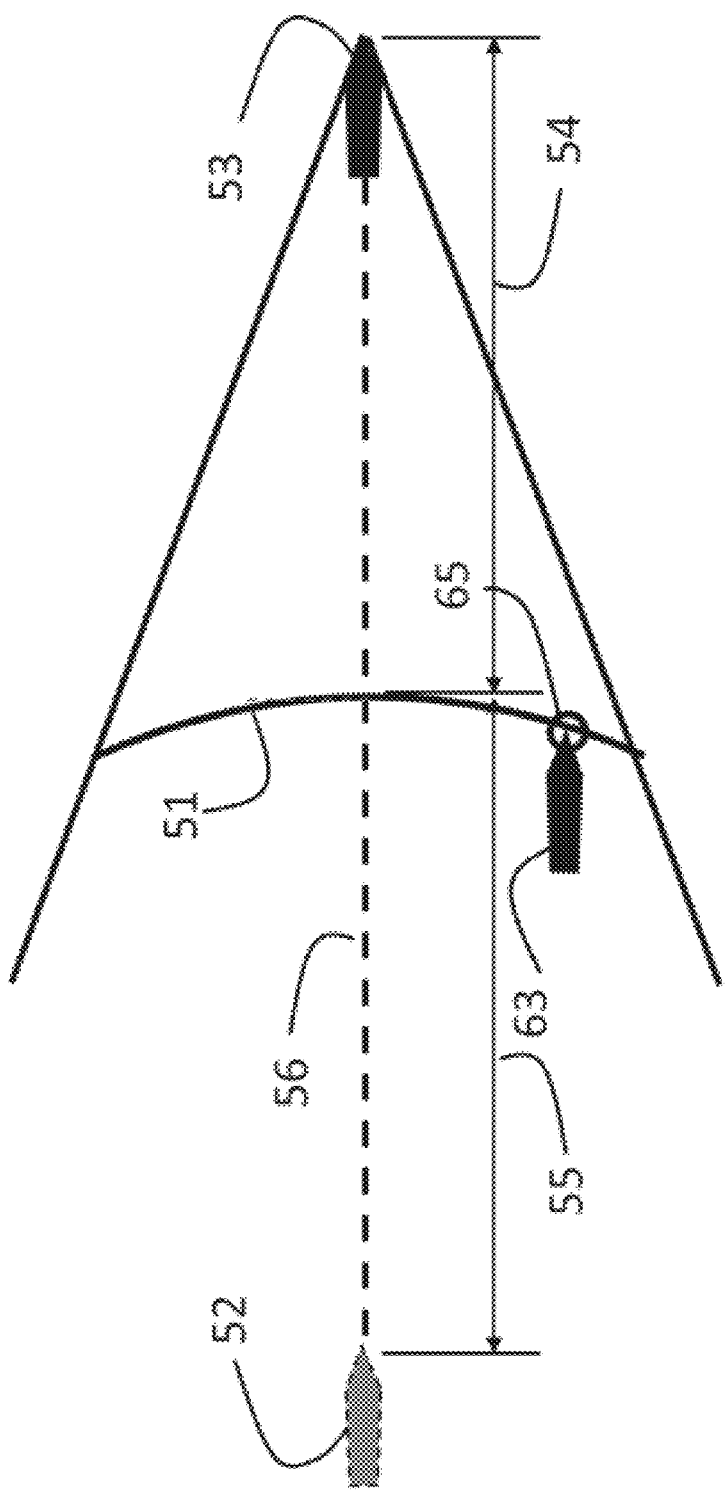
FIG. 8 illustrates a transverse wave in a vessel's Kelvin wake is located at an equal distance between where the vessel was positioned when the wave was created and its current location when traversing along a straight path at a constant speed.

FIG. 8 shows the transverse wave trough 51 that is aligned with the follower vessel's 63 location when positioned at a wave-making reduction location 65. When traversing along a straight path 56 at a constant speed the Kelvin wake's transverse wave trough 51 is located at an equal distance (54=55) between where the lead vessel was positioned when the transverse wave was created 52 and its current location 53. Any point within the Kelvin wake maintains the relationship that the transverse wave along which the point is located (x distance) is an equal distance between the vessel's current location and the location where the transverse wave was generated.

Figure 9:
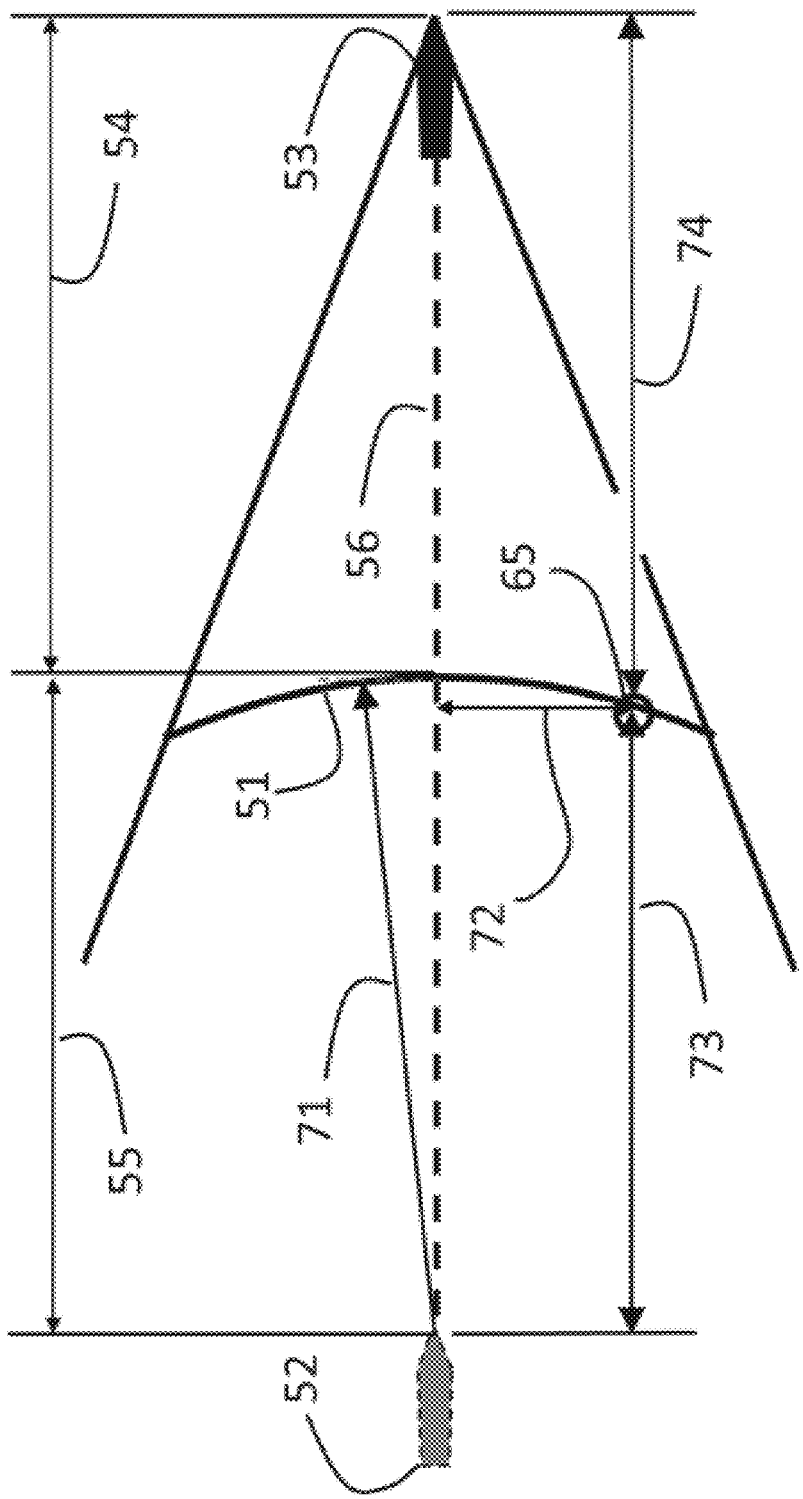
FIG. 9 illustrates a position of the optimum wave-making resistance reduction location with respect to the current vessel's location and with respect to the vessel's location where the optimum wave-making resistance reduction position was created.

FIG. 9 shows a trigonometry algorithm, using the wave-making resistance reduction location 65, that determines the radius 71 and distances 54 and 55 between the bow of the lead vessel's current location 53 and its location 52 where the transverse wave 51 was created. Additionally, the algorithm determines the length of time it takes for the transverse wave 51 and wave-making resistance reduction point 65 to propagate from the location where they were created at the bow of vessel 52 to their current location shown. For example, if the vessel's speed was 20 ft/sec and each of the distances 54 and 55 were 400 ft the time for the transverse wave 51 to propagate from the bow of the vessel located at 52 to its current location would be (800 ft)/(20 ft/sec) or seconds. This data is used in an algorithm, referred to as the Vessel Positioning Algorithm, which controls the time dependent positional separation of the lead and follower vessels.

Figure 10:
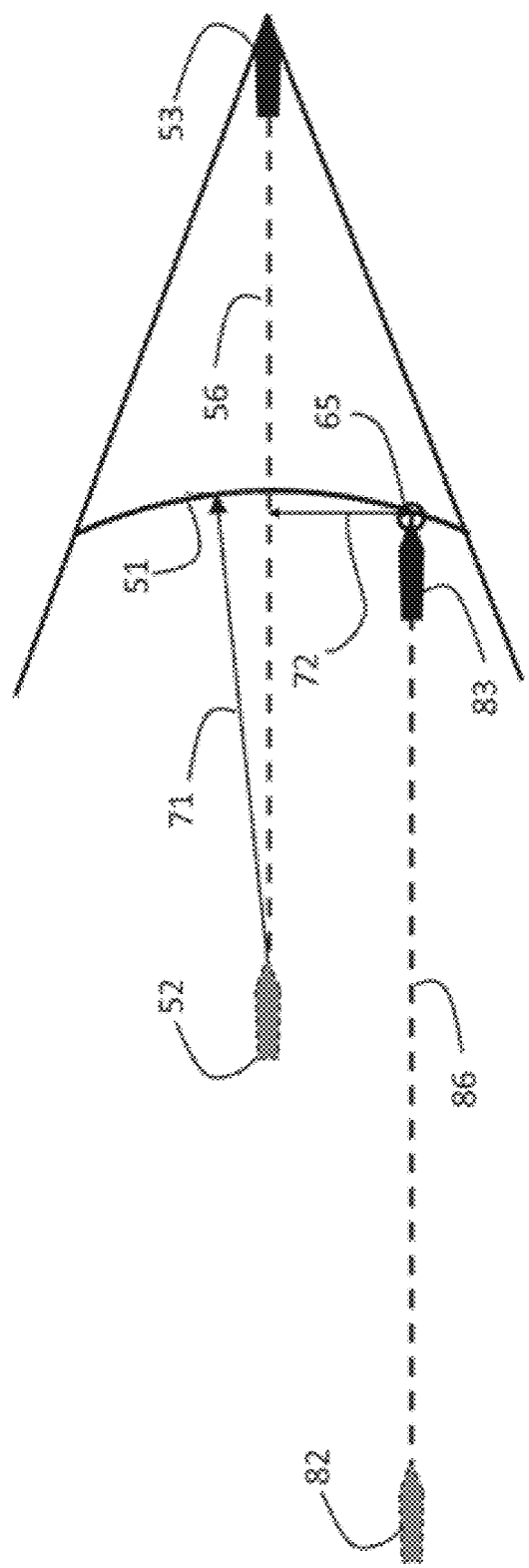
FIG. 10 illustrates a path of the follower vessel's position from its location when the lead vessel created the transverse wave to the optimum wave-making resistance reduction location.

FIG. 10 shows straight paths for both the lead 56 and follower 86 vessels. The position for the follower vessel with respect to the lead vessel is determined by the Vessel Positioning Algorithm. When the lead and follower vessels are at positions 52 and 82, respectively, vessel 82 receives a command as to the location and time when the follower vessel (vessel 82) is to arrive at position 83. The follower vessel may be continuously updated for position and time while proceeding along a time dependent positionally defined path 86.

Figure 11A:
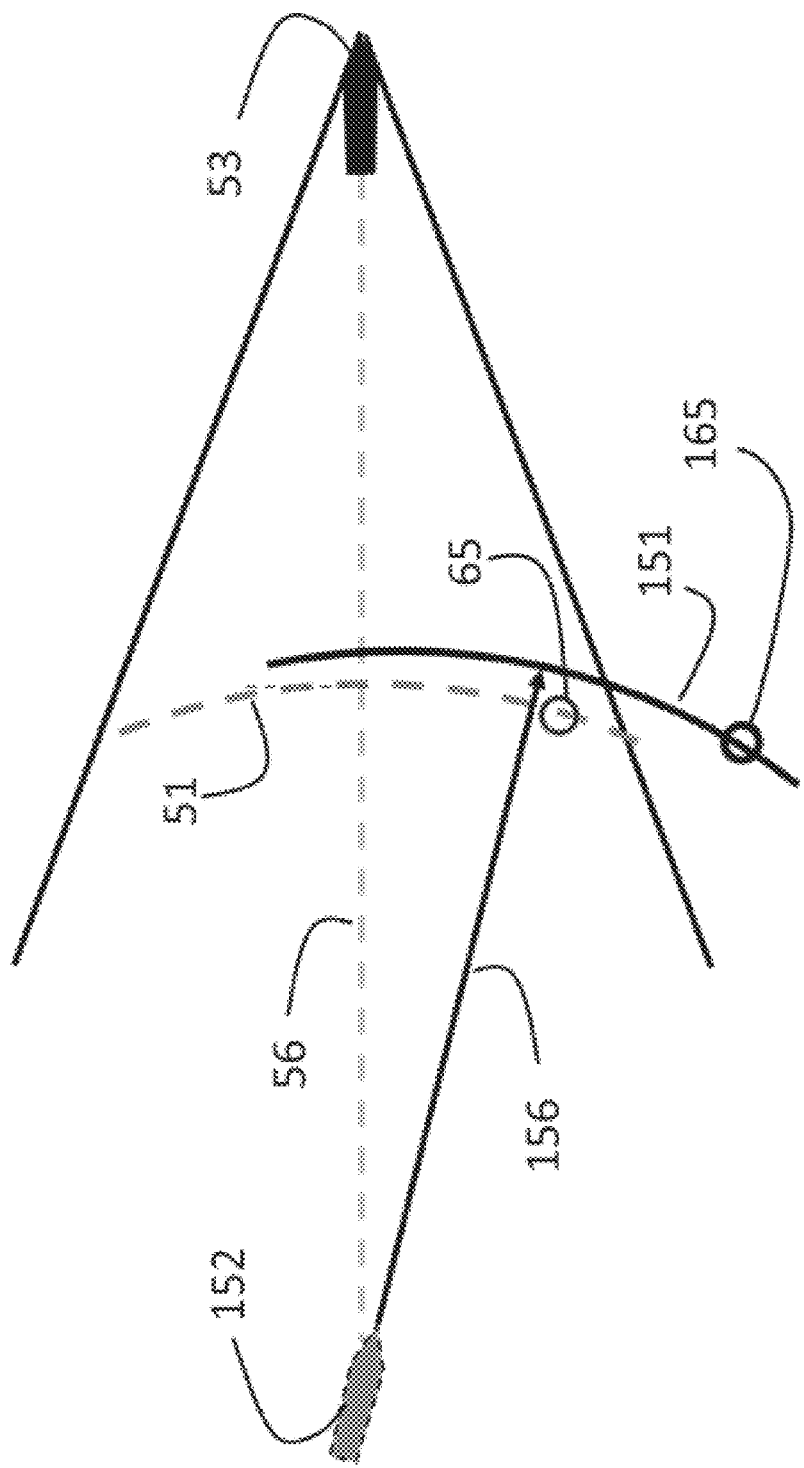
FIG. 11A illustrates a change in the position of the optimum wave-making resistance reduction location with respect to the current vessel's location due to a change in the water axis heading and resulting transverse wave propagation direction where the optimum wave-making resistance reduction position was created.

FIG. 11A shows a change in the position of the optimum wave-making resistance reduction location from 65 to 165 with respect to the current vessel's location 53. This change in location 165 is due to the different water axis heading and resulting transverse wave propagation direction from where the vessel was located 152 when the optimum wave-making resistance reduction position 165 was created.

Figure 11B:
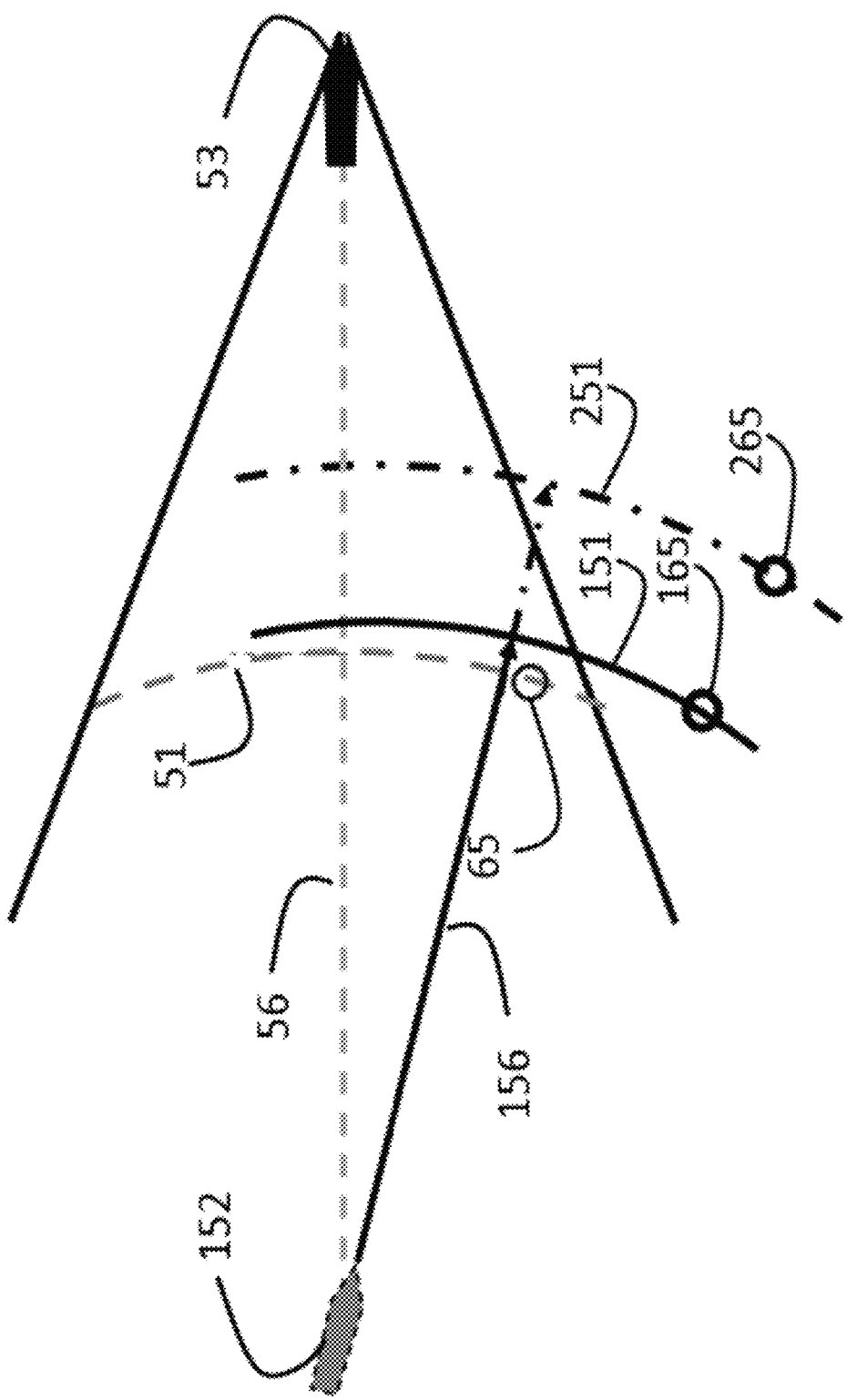
FIG. 11B illustrates a change in the position of the optimum wave-making resistance reduction location with respect to the current vessel's location and the location where the transverse wave was generated, such change in location due to the different water axis speed (increase) and resulting transverse wave propagation speed from where the vessel was located when the optimum wave-making resistance reduction position was created.

FIG. 11B shows a change in the position of the optimum wave-making resistance reduction location from 165 to 265 with respect to the current vessel's location 53 and vessel's location 152 where the transverse wave was generated. This change in location 265 is due to the different water axis speed (increase) and resulting transverse wave 251 propagation speed from where the vessel was located 152 when the optimum wave-making resistance reduction position was created.

Figure 12A:
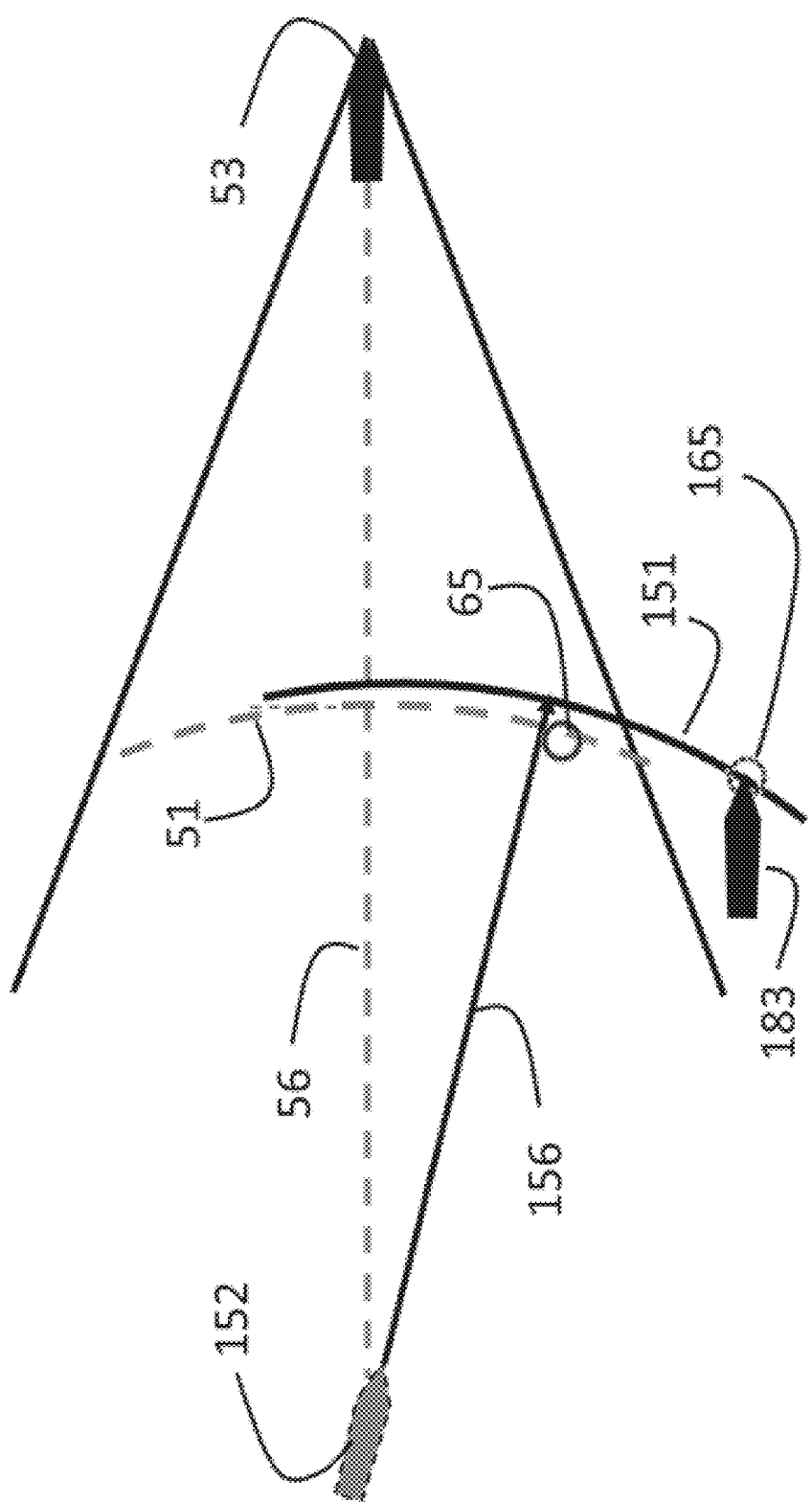
FIG. 12A illustrates a follower vessel's position determined by the lead vessel's location, speed and heading when creating the transverse wave.

FIG. 12A shows a change in the position of the wave-making resistance reduction location from 65 to 165 for the follower vessel 183. The change in location is due to the lead vessel's 152 water axis not being aligned with a straight path 56 as shown in FIG. 11. The propagation of the transverse wave created by the lead vessel 152 is in the direction of the water axis 156 creating the transverse wave 151 and resistance reduction locations 165. The lead vessels path forward of its location 152 does not affect the propagation or location of transverse wave 151 or the wave-making resistance reduction location 165. The Vessel Positioning Algorithm determines the positions of the lead vessel and the follower vessel current location, which may include their global (GPS) positions.

Figure 12B:
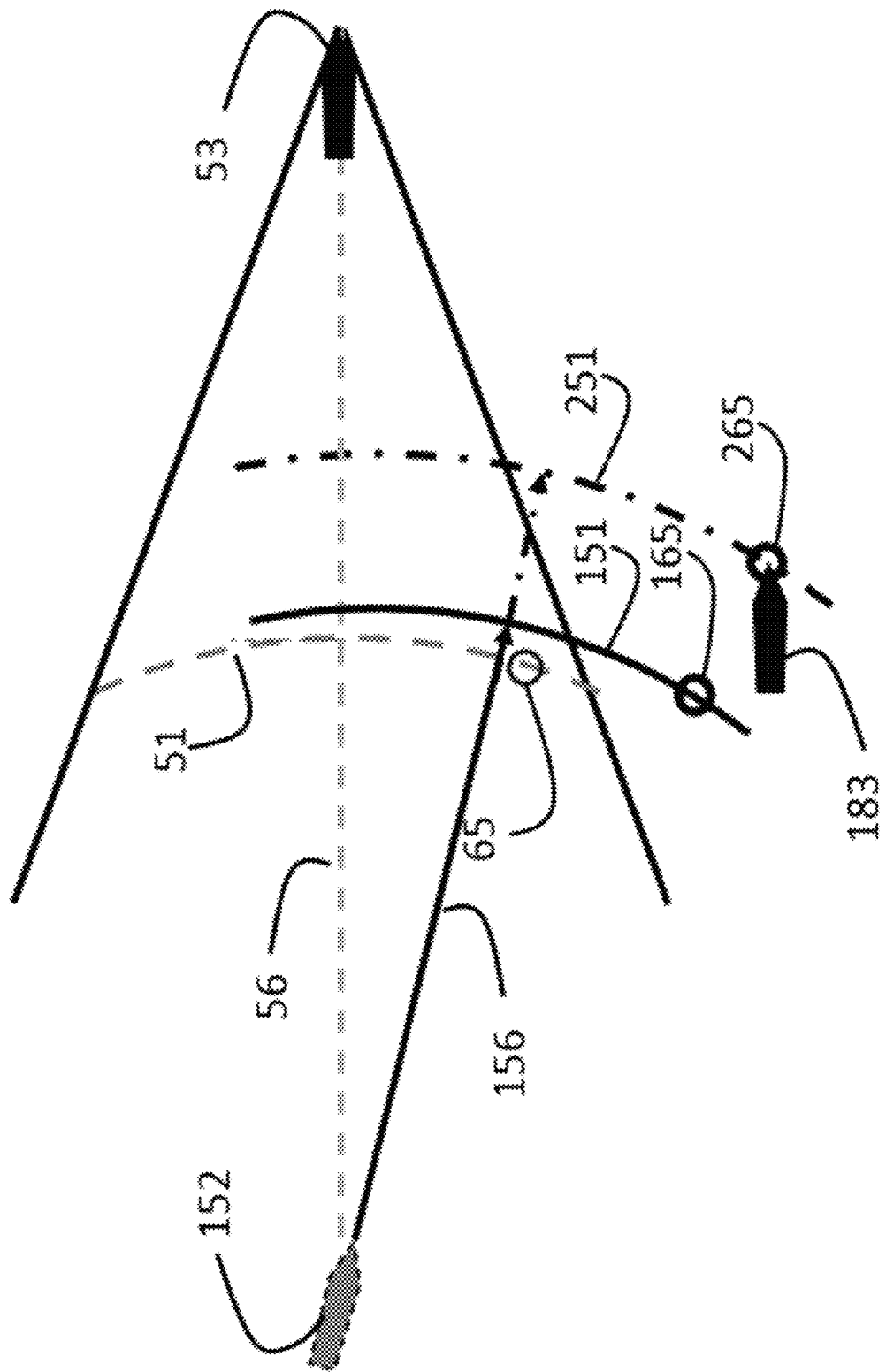
FIG. 12B illustrates a change in the position of the wave-making resistance reduction location for the follower vessel due to the Lead vessel's water axis speed being different (increase) from the speed as shown in FIG. 11*b* when the transverse wave was generated.

FIG. 12B shows a change in the position of the wave-making resistance reduction location from 165 to 265 for the follower vessel 183. The change in location is due to the lead vessel's 152 water axis speed being different (increase) from the speed as shown in FIG. 11 when the transverse wave 151 was generated. The propagation of the transverse wave created by the lead vessel 152 at the different speed is in the direction of the water axis 156 creating the transverse wave 251 and resistance reduction location 265. The lead vessels path forward of its location 152 does not affect the propagation or location of transverse wave 251 or the wave-making resistance reduction location 265. The Vessel Positioning Algorithm determines the positions of the lead vessel's and the follower vessel's current location, which may include their global (GPS) positions.

Figure 13:
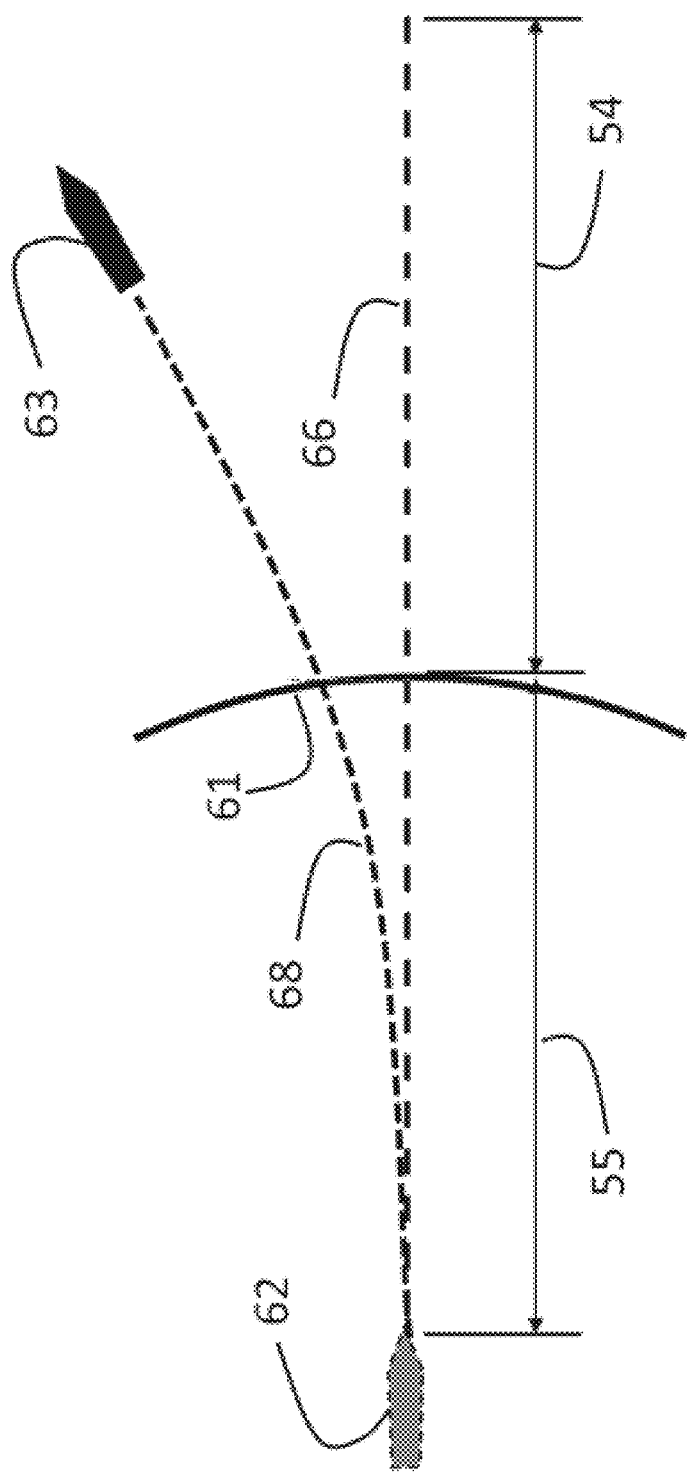
FIG. 13 illustrates transverse wave propagation dependent on vessel's water axis speed and direction from location where transverse wave was generated. Vessel's path after transverse wave is generated does not affect transverse wave propagation speed or direction.

FIG. 13 shows a vessel on a path 68 where the water axis heading is changing due to a turning maneuver. The Kelvin wake's transverse wave propagation direction is dependent on vessel's water axis direction at the location when the transverse wave was generated. When the vessel is at location 62 the vessel generates a transverse wave that propagates in the direction of the vessel's water axis path 66. After the transverse wave is generated, the vessel's change in water axis heading along the maneuvering path 68 does not affect the propagation speed or direction of the transverse wave that was generated at location 62.

Figure 14:
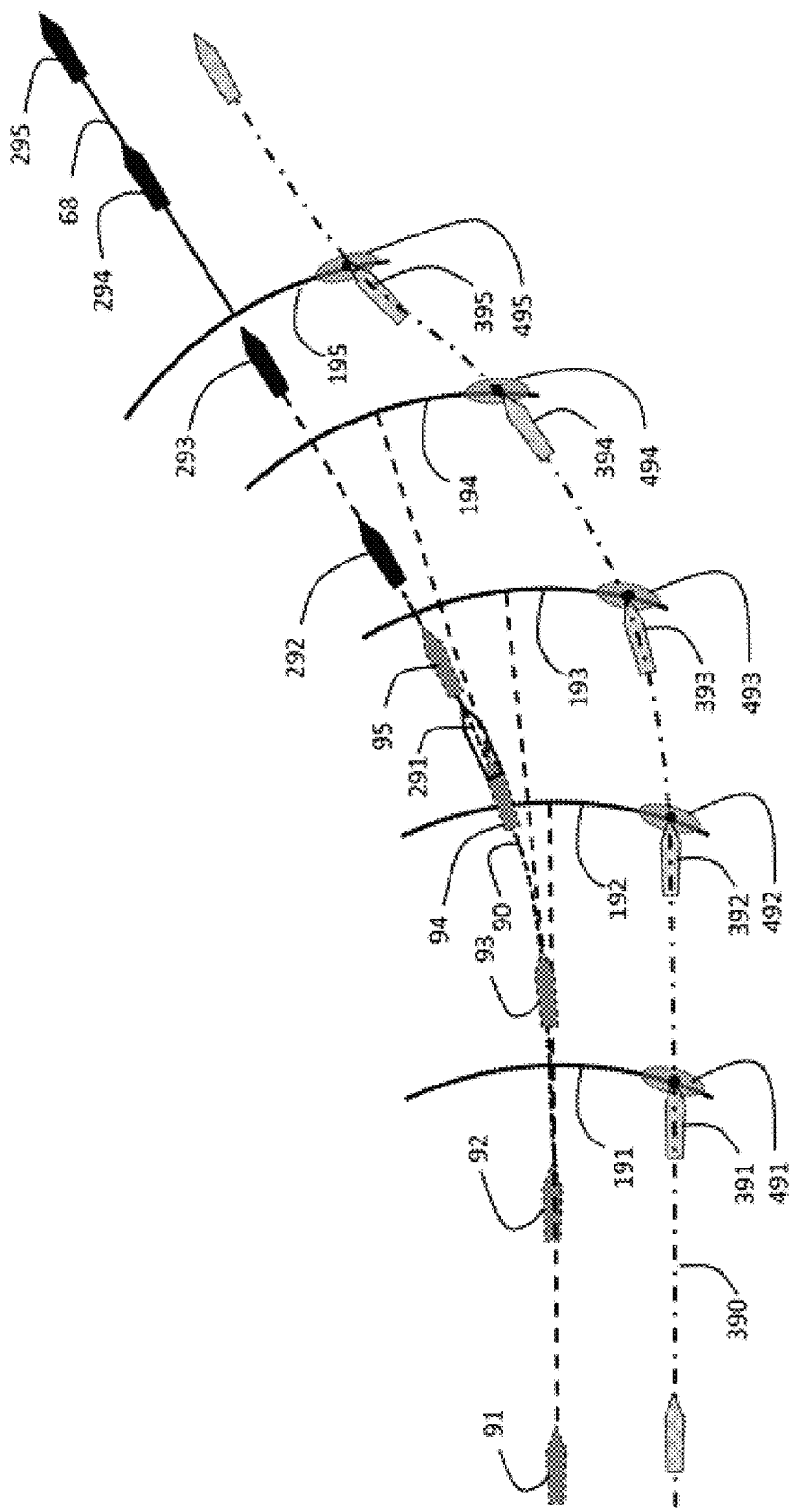
FIG. 14 illustrates transverse wave propagation and follower vessel's path in a turn.

FIG. 14 depicts a lead vessel travelling along a path 90 where it executes a turn from one straight path to another straight path at a different water axis heading. Several vessel positions (91, 92, 93, 94 and 95) along the path 90 show the location and heading of the lead vessel where it generates a transverse wave and the location of the respective transverse waves (191, 192, 193, 194 and 195 respectively) when the lead vessel is at its current relative location (291, 292, 293, 294 and 295). The wave-making reduction location and associated zone (491, 492, 493, 494 & 495) is shown for each transverse wave location. In exemplary embodiments, the process assumes that the wave-making resistance location and associated zone (as depicted in the FIG. 6 Detailed Description) is at the same location on the transverse wave from when it was generated to where it is located as it propagates. The Vessel Positioning Algorithm calculates a time dependent path 390 positioning the follower vessel (391, 392, 393, 394 and 395) within the respective wave-making resistance zones (491, 492, 493, 494 and 495) at the respective times. So, for example, the lead vessel when at 93 generated the transverse wave at 193 which propagated in the seaway according to the lead vessel heading when at 93, and the lead vessel surpassed this transverse wave 193 and is now located at position 293. The wave-making reduction region 493 is associated with this transverse wave 193 as it has propagated, and the follower vessel is positioned at 393 when it reaches this transverse wave. The prior or subsequent numbers in the sequence follow the same approach.

Figure 15:
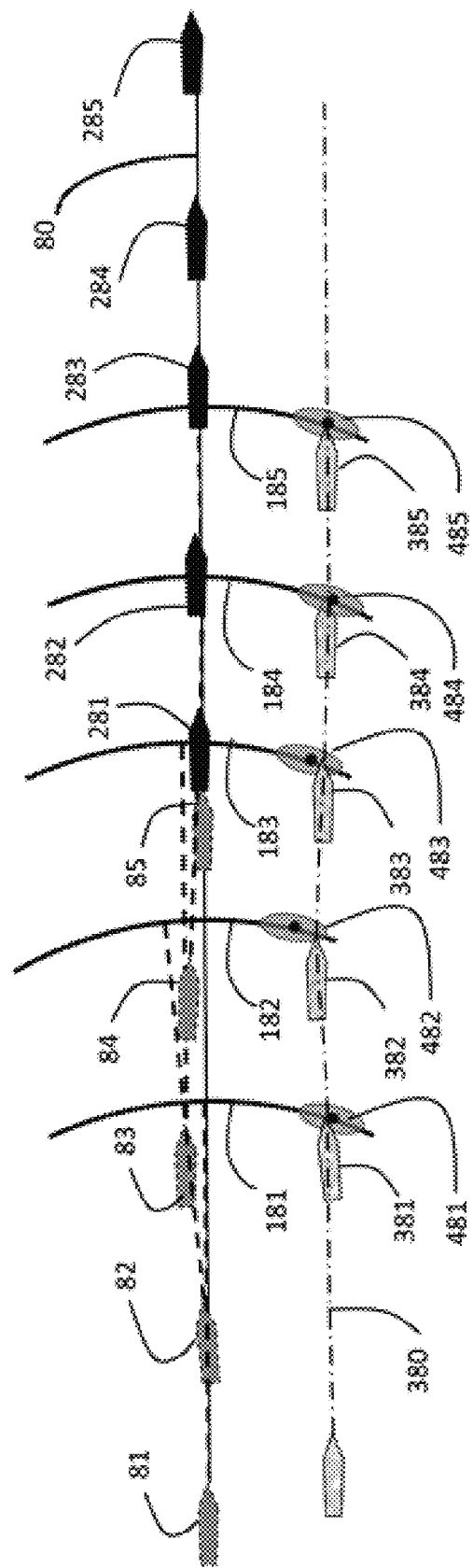
FIG. 15 illustrates transverse wave propagation and follower vessel's path when correcting for perturbation to lead vessel's course.

FIG. 15 illustrates a transverse wave propagation and follower vessel's path when correcting for perturbation to the lead vessel's course. As shown, the lead vessel is travelling along a path 80 where it is perturbed from and returns to a straight path. Forces on the vessel that can perturb the vessel's path could include, but are not limited to, water current, seaway waves, wind, vessel directional instability, maneuvering forces, or the like. These perturbations to the vessel's water axis heading are depicted by several lead vessel positions (81, 82, 83, 84 and 85) along the path 80 that show the location and heading of the lead vessel where it generates a transverse wave and the location of the transverse waves (181, 182, 183, 184 and 185 respectively) when the lead vessel is at its current relative location (281, 282, 283, 284 and 285). The wave-making reduction location and associated zone (481, 482, 483, 484 and 485) is shown for each transverse wave location. The Vessel Positioning Algorithm calculates a time dependent path 380 positioning the follower vessel (381, 382, 383, 384, 385) within the wave-making resistance zones (481, 482, 483, 484 & 485). The sequence of numbers follow the same approach as described above in connection with FIG. 14.

Figure 16:
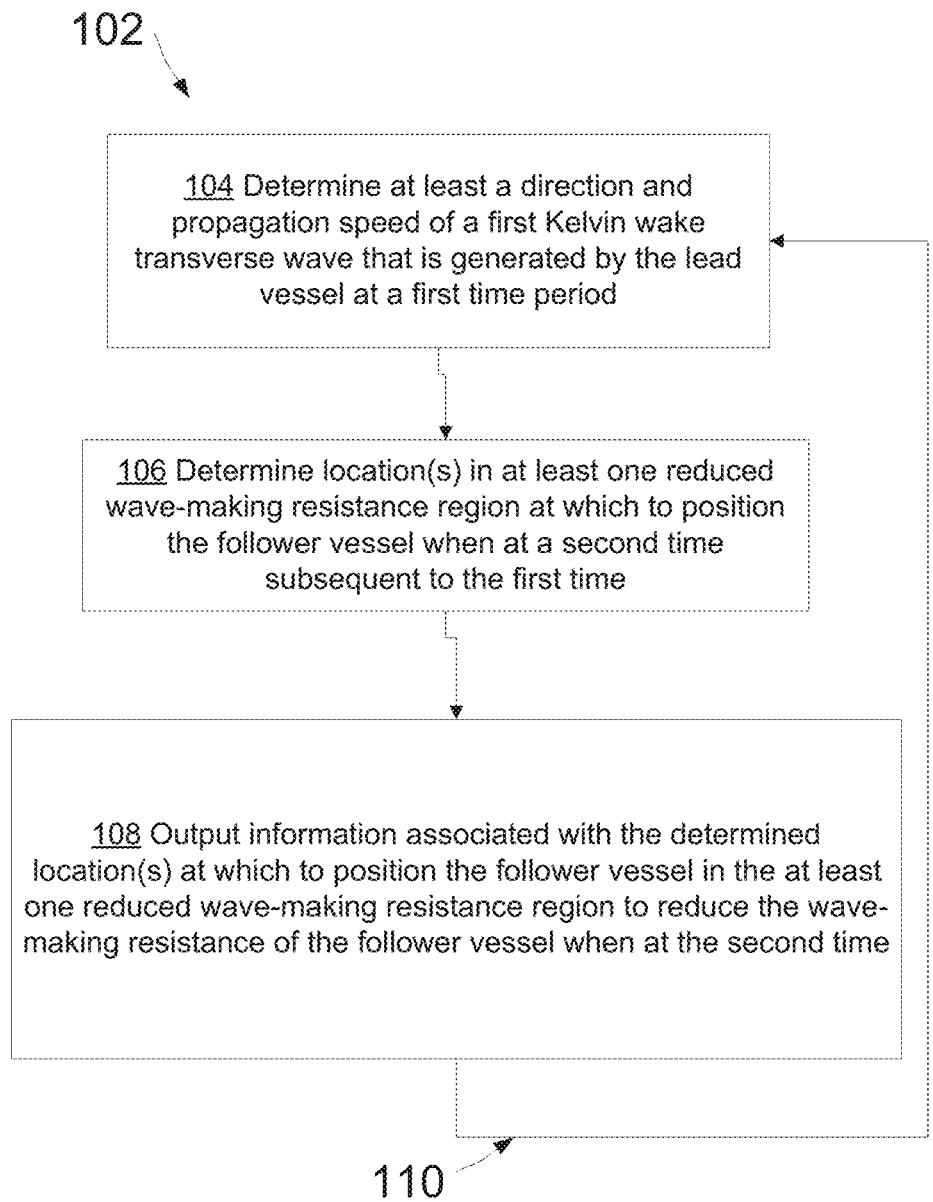
FIG. 16 illustrates a flow diagram for an exemplary process (e.g., algorithm) used by the system, method, and/or exemplary program code (software) according to the present disclosure.

FIG. 16 illustrates an exemplary process 102 that may be employed by an exemplary system, method, and/or program code (e.g., software) according to the present disclosure in view of the foregoing description, which is used for reducing wave-making resistance of at least one follower vessel following at least one lead vessel operating in a seaway. Such process 102 may be referred to as a Vessel Positioning Algorithm. Generally, the process 102 uses a time-dependent approach that is configured to account for variations in the state of the at least one lead vessel, such as variations in at least that of speed and/or heading of the lead vessel, over a period of time. The process 102 generally includes at least the following described steps, which may be performed by at least one processor and/or at least one controller of the system, and/or which may obtain data from one or more sensors, as shown and described herein, and/or as would be understood by those having ordinary skill in the art. It is understood that although shown in a particular sequence with particular processing blocks for a particular algorithm, the sequence of the process 102 could be different, additional step(s) could be added, or some steps(s) could be omitted as would be understood by those having ordinary skill in the art.

At 104, the process 102 may include determining at least a direction of at least one first Kelvin wake transverse wave generated by the at least one lead vessel, in which the at least one first Kelvin wake wave is generated by the at least one lead vessel at a first time and propagates in the seaway until at least a second time subsequent to the first time.

As described above, determining which Kelvin wake transverse wave to follow at the first time when generated to the subsequent time(s) may include first determining a wave-making resistance region at which to position the follower vessel to provide destructive cancelation with the Kelvin wake transverse wave. This may be based at least in part on determining or predicting the periodic wave pattern (e.g., frequency) of the Kelvin wake transverse wave(s) when generated, and more particularly by determining the lead vessel's Kelvin wake diverging wave patterns' interactions with the first Kelvin wake transverse wave (e.g., interactions of transverse and diverging waves) to determine one or more locations along the first Kelvin wake transverse wave that include one or more reduced wave making resistance regions compared to other regions along the first Kelvin wake transverse wave. As noted above in connection with at least FIGS. 5-7, for example, such calculation may include generating a wave making resistance region map that includes magnitudes of wave making resistance for the at least one follower vessel at multiple locations in the Kelvin wake field (e.g., FIG. 5), then determining an optimal or desired wave-making resistance region at which to position the follower vessel in accordance with the map (e.g., FIG. 6), and then selecting the Kelvin wake transverse wave associated with the selected wave-making resistance region (e.g., FIG. 7) for determining where to position the follower vessel at the second time when it reaches this selected Kelvin wake transverse wave as it propagates through the seaway.

Determining the direction of the at least one first Kelvin wake wave generated at the first time may be based at least in part on a first heading of the at least one lead vessel at the first time. Determining the wave-making resistance region(s) and thus where to position the follower vessel at the second time may be based at least in part on a speed of lead vessel when the Kelvin wake transverse wave is generated. The location of the lead vessel when the Kelvin wake transverse wave is generated also may be used in such determinations. Such information may be ascertained by gathering information from at least one sensor, such as a GPS sensor that provides time, speed, and location tracking of the at least one lead vessel. Alternatively or additionally, such sensor data may be provided by at least one of a radar sensor, a LIDAR sensor, an optical sensor (e.g., camera), and/or an inertia (IMU) sensor. Speed of the lead vessel also could be determined by using a suitable sensor to detect propulsion thrust, propeller speed, water current, or the like. As noted above in connection with FIG. 4, when operating in a seaway where the vessel encounters wind, wave and current forces acting on the vessel, such perturbances can change the alignment orientation of the reference frames, and the Kelvin wake waves that are being generated may propagate aligned with the change in water axis heading. Accordingly, the determination of speed preferably may be referenced to speed through the water (speed aligned with the water axis) and heading preferably may be in reference to the heading through the water (direction of the water axis), which such parameter references are particularly useful for determining the transverse wave wavelength and resistance reduction map (zone) alignment. As such, a suitable water direction and/or water speed sensor for water axis heading and water axis speed may be utilized for such water-axis speed and heading determination. Such sensor(s) as described above may be located remotely, such as land-based, sea-based, aerial-based, and/or satellite-based, which may be outside the region of the fleet. Such sensor(s) also may be located locally, such as onboard the at least one follower vessel, onboard the at least one lead vessel, and/or onboard at least one other vessel in the fleet that is not the at least one lead vessel and is not the at least one follower vessel.

As noted above in connection with FIG. 5, for example, determination of the reduced wave-making resistance regions may be preprocessed, such as before the first time when the wave is generated, and this information can be stored and retrieved by the at least one processor for use in the calculations when the first Kelvin wake transverse wave is generated or a time thereafter. Such preprocessed data may include a different wave-making resistance map, or a determination of different reduced wave-making resistance regions, based upon factors such as actual or predicted speed of the lead vessel, which the processor(s) may retrieve the relevant wave-making resistance data based on such speed. The differences in lead and follower vessel geometries also may enable retrieving different wave-making resistance data, which such retrieval and data may change if a different type of follower vessel swaps positions with the original follower vessel, for example. It is of course understood that, provided sufficient processing power is available, such calculations and determination of the wave-making resistance regions could be done in real-time based on the actual speeds, etc. of the vessels operating in the coordinated fleet. In such manner, determining the reduced wave-making resistance regions associated with the Kelvin wake transverse wave may be determined at the first time when the transverse wave is generated, or may occur at a subsequent time, such as at an intervening time between the first and second time when the follower vessel reaches the transverse wave.

It is also understood that while the wave-making resistance regions can be determine based upon calculations using variables such as speed, such information also can be determined empirically by actually positioning the follower vessel(s) at different locations within the Kelvin wake of the lead vessel, measuring the actual wave-making resistance at those locations, and then maintaining positions of the follower vessel(s) along a track that corresponds with a track of the lead vessel. Such an empirical "hunting" approach may be performed by recording resistance reduction by thrust reduction, fuel reduction and/or rpm reduction at each positioned location, for example.

It is understood that the designation "first" time is an arbitrary time and does not necessarily signify an initial time at which the lead vessel begins generating Kelvin wake waves; but rather could be at any time when the Kelvin wake wave(s) of interest is/are generated. Accordingly, the "first" time may be a point in time, which may be represented as data in the form of a time post from information received via at least one sensor, such as a GPS sensor. Alternatively, the first time may include information such as location, speed and/or heading associated with the lead vessel is tracked over the time period. Accordingly, such time posts may be represented as data points in the form of time posts from information received via at least one sensor, such as a GPS sensor. It also is understood that the determining (i.e., the calculation) of the direction of the first Kelvin wake wave may be done essentially immediately upon generation of the first Kelvin wake wave of interest. In this manner, the determining the direction of the at least one first Kelvin wake wave generated by the at least one lead vessel is performed at the time when the Kelvin wake wave of interest is generated. If the calculation is performed at a subsequent time, it is necessary to perform this step prior to when the follower vessel reaches the desired wave-making resistance region (described in the following step) so that the follower vessel has sufficient time to reach this region.

At 106, the process may include determining. at least one or more reduced wave-making resistance region locations and the subsequent second time at which to position the at least one follower vessel when the at least one follower vessel reaches the determined location. As noted above in connection with at least FIGS. 14 and 15, for example, determining the reduced wave-making resistance regions associated with the generated Kelvin wake transverse wave may be based upon an assumption that such wave-making resistance region(s) are maintained at the same location(s) on the transverse wave, for example according to the wave-making resistance map, as the transverse wave propagates from the first time to at least the second time. As described above, the heading and speed of the lead vessel (e.g., along the water axis) may be used in such determination of the propagation of the Kelvin wake transverse wave, along with a suitable propagation determination technique, such as a gravity wave theory approach. Alternatively or additionally, the heading, speed and/or location of the transverse wave itself may be tracked, such as by using an optical sensor or other suitable means, or the like. Such determinations also may be in accordance with the descriptions associated with one or more of FIGS. 8-13, for example.

It is understood that the designation "second" time is subsequent to the first time and determined by the transverse wave propagation speed and distance to the designated reduced wave-making resistance region location. Accordingly, the "second" time may be a point in time, which may be represented as data in the form of a time post from information received via at least one sensor, such as a GPS sensor at the first time and derived from the propagation speed and distance to the designated reduced wave-making resistance region location. Alternatively, the second time may include a time period in which information such as location, speed and/or heading associated with the follower vessel is tracked over the time period. Accordingly, such time period may be represented as data points in the form of time posts from information received via at least one sensor, such as a GPS sensor at the first time and derived from the propagation speed and distance to the designated reduced wave-making resistance region location. It also is understood that the determining (i.e., the calculation) of where to position the follower vessel at the second time may be done essentially immediately upon generation of the first Kelvin wake wave of interest (i.e., at the "first time"); or the calculation may be performed subsequently by storing data and performing the calculation later. In this manner, the determining may be performed immediately or within minutes of the time when the Kelvin wake wave of interest is generated. If the calculation is performed at a subsequent time, it is necessary to perform this step prior to when the follower vessel reaches the desired wave-making resistance region so that the follower vessel has sufficient time to reach this region.

It is understood that although an exemplary process is described above, the system and methods according to the present disclosure also includes alterations to such process. For example, instead of first determining the reduced wave-making resistance regions (e.g., via a wave-resistance map) to determine a selected transverse wave, the system could instead choose or predict a transverse wave and then determine the reduced wave-making resistance regions associated with that selected transverse wave. This could occur at the time of generating the Kelvin wake transverse wave, or after the transverse wave is generated. After the wave-making resistance reduction zones are determined, the process could assume the same location is maintained on the transverse wave as it propagates, or the system could perform calculations to determine the wave-making resistance regions at a subsequent time when the wave has propagated. It is understood that although the use of a wave-making resistance map is beneficial to provide greater detail as to magnitudes of wave-making resistance, such additional detail is not necessarily required.

At 108, the process includes outputting information associated with the determined location(s) at which to position the at least one follower vessel in the at least one reduced wave-making resistance region when the at least one follower vessel reaches the selected Kelvin wake transverse wave at the second time to thereby reduce the wave-making resistance of the at least one follower vessel. The information may be output for use to control the at least one follower vessel automatically or by manned control. Such information may be output immediately, such as to suitable random-access memory (RAM), or may be output to a non-transitory medium, such as a hard-drive, for later usage. When the output information is used to automatically adjust the positioning of the at least one follower vessel, this may be accomplished by sending signals to effectors (e.g., thrust, rudder or the like) of the follower vessel to position the vessel at the determined location. When the output information is output for manned usage, such information may be output to a display (e.g., a wave making resistance map, such as in FIGS. 5-6, or the like) for an operator to adjust the positioning of the at least one following vessel based at least in part upon the output information on the display. The display and operator may be onboard the follower vessel and/or may be remote from the follower vessel. The output of such information to a display or the like may be done essentially immediately upon generation of the first Kelvin wake wave of interest (i.e., at the "first time"); or the calculation may be performed subsequently by storing data and performing the calculation later. In this manner, the determining may be performed immediately after the Kelvin wake wave of interest is generated or at a subsequent time. If the calculation is performed at a subsequent time, it is necessary to perform this step prior to when the follower vessel reaches the desired wave-making resistance region so that the follower vessel has sufficient time to reach this region.

The steps 104 through 108 of the process 102 may be considered a sequence, and the sequence may repeat as shown at 110. The process may repeat the sequence at continuous or intermittent time intervals to continuously or intermittently track the at least one lead vessel and continuously or intermittently define the position for the at least one follower vessel at the at least one reduced wave-making resistance region associated with the Kelvin wake wave created by the at least one lead vessel at the time preceding the subsequent time. Such process may also enable the control of the follower vessel based on the defined position. The tracking of the at least one lead vessel, the reduced wave-making resistance region, and/or the at least one follower vessel may include gathering time synchronized data of at least location, speed, and/or heading thereof by at least one sensor, such as GPS sensor(s). Such tracking may enable improved tracking of the follower vessel to follow subsequent Kelvin wake waves generated by the at least one lead vessel as the at least one lead vessel changes its state, such as changes by changing speed or diverging from a linear track. In other words, tracking with sufficient data points may provide the follower vessel(s) sufficient time to position within the reduced wave-making resistance region(s). When tracking is used to track the lead vessel and/or the resistance reduction region, the display may show this track, for example.

According to at least one exemplary algorithm using such process 102, the process may include the following steps: (i) continuously ascertain position, speed and heading of the at least one lead vessel at continuing time posts that are subsequent to the first time, and determine at least a direction and propagation speed of subsequent Kelvin wake waves of the at least one lead vessel, wherein the subsequent Kelvin wake waves are generated by the at least one lead vessel at the subsequent times; (ii) at the subsequent times, determine subsequent reduced wave-making resistance regions associated with the respective subsequent Kelvin wake waves generated by the lead vessel at the subsequent times and also determine where to position the follower vessel(s) at these subsequently determined reduced wave-making resistance regions; (iii) continuously construct an at least one lead vessel track of the continuously ascertained positions as coordinated by the at least one lead vessel time posts; and continuously construct an at least one follower vessel track of the continuously determined reduced wave-making resistance regions and associated positional determinations for the follower vessel(s) for reducing the wave-making resistance of the at least one follower vessel as coordinated by the at least one lead vessel time posts; and (iv) output information associated with the determined at least one follower vessel track of the continuously determined positions for reducing the wave-making resistance of the at least one follower vessel as coordinated by the at least one lead vessel time posts, thereby reducing the wave-making resistance of the at least one follower vessel as the at least one follower vessel tracks the continuously determined region for reducing the wave-making resistance as coordinated by the at least one lead vessel time posts.

Exemplary embodiment(s) may include the foregoing exemplary system, method, or software that further accounts for seaway-induced vessel motion data according to U.S. Ser. No. 17/682,571. In such case, at least one electronic processor and/or controller may be configured to: obtain data including position and speed data of at least one lead vessel in the fleet; and seaway-induced vessel motion data of one or more vessels in the fleet; determine a wavelength and a direction of seaway waves that cause a surge motion of the one or more vessels in the fleet based, at least in part, on the seaway-induced vessel motion data; determine a position of the at least one follower vessel that, when occupied by the at least one follower vessel, positions the at least one follower vessel within at least one coordinated zone, which is a zone within the determined at least one reduced wave-making resistance region in which the at least one lead vessel and the at least one follower vessel have a synchronized surge motion, wherein the synchronized surge motion is based, at least in part, on the determined wavelength and the direction of the seaway waves that cause the surge motion of the of one or more vessels in the fleet; and output information associated with the determined position of the at least one follower vessel to position the at least one follower vessel at the determined position thereby reducing the positioning control requirements and maintaining the reduced wave-making resistance of the at least one follower vessel.

In some instances, the vessels may be operating at a desired speed of advance (SOA). The SOA is used to indicate the speed to be made along the intended track, with the intended (anticipated, desired) speed along the track being with respect to the earth, which may take into consideration the effect of known or predicted current. In such a scenario, although the vessels presumably should be making good on their time of arrival, this may be at the cost of significant fuel consumption. The system according to the present disclosure can determine the reduced wave-making resistance regions and/or the coordinated zones where synchronized surge motions overlap, and then output relevant information (e.g., autonomously or to an operator) to slightly alter the speed of advance of one or more of the vessels to balance time of arrival with fuel savings. An exemplary method of adjusting the vessel speed according to the foregoing balancing approach is shown in FIG. 17B, which is described in further detail below.

The techniques described herein may be used to control the operation of vessels of equal, similar, and/or differing hull forms (e.g., a length, a beam, a draft, a displacement, a monohull, a catamaran, a trimaran, a Small Waterplane Area Twin Hull (SWATH) etc.). The techniques of the present disclosure may be used to control formation positions of multiple vessels in a significant sea at all headings with substantially reduced wave-making resistance.

The system, method, and/or software 102 may further be used as a foundation of a fuel savings and carbon tax credit monitoring and reporting system for maritime shipping. Essentially, either a fleet operator or strategic partners could utilize common maritime traffic patterns to plan routes where collaborative ship formations could use the wave cancelation strategy described herein to save fuel and reduce greenhouse gas emissions. The savings would be recorded by system and communicated to a remote-based monitoring system that would report not only fuel savings but greenhouse gas emission savings that may be used for carbon tax credits.

A more specific process according to the present disclosure may be referred to as a Vessel Positioning Algorithm, and which may include the foregoing description including that associated with at least FIGS. 5-16, for example. The Vessel Positioning Algorithm along with exemplary sensors and data used to calculate the positional arrangement of the follower vessel(s) to reduce the wave-making resistance of Follower vessel(s). According to this exemplary embodiment, the Vessel Positioning Algorithm's processing may include:

(i) An adjustment to the position of database information including CFD analyses (wave-making resistance maps), scale model hydrodynamic test data, full scale trials. The database position data are calculated or obtained at a limited number of specific speeds. To accurately control the vessel(s)' positions the controller needs to know the positions at all speeds. The Vessel Positioning Algorithm, using e.g., wave theory, calculates an adjusted position for the wave-making resistance for the actual vessel(s) operational speeds. This calculation may be performed when a significant change in water axis speed is observed.

(ii) Conducting a search of the speed adjusted wave-making resistance map to identify an optimum position for the follower vessel.

(iii) A calculation of the transverse wave's position (distance from the bow of the lead vessel) that aligns with adjusted CFD analyses, scale model hydrodynamic test data, full scale trials positions of the follower vessel. The transverse wave may be used to determine the location where the transverse wave was created. This calculation may be continuous (at least every second) as transverse waves are constantly being generated.

(iv) Establishing the global position and time when the transverse waves are created. This calculation may be continuous (at least every second) as transverse waves are constantly being generated.

(v) A calculation of the transverse waves' propagation accounting for perturbations in the vessel's water axis heading and speed that occur due to a seaway environment consisting of; a water current and/or sea waves and/or wind (referred to as external forces) and/or perturbations due to a vessel's lateral and/or directional instability and/or the vessels response to a controlled maneuver (referred to as control forces) resulting in a lateral or directional motion. This calculation may be continuous (at least every second) as perturbations to a vessel's heading and speed are continual and the transverse waves are constantly being generated. Results of this calculation process define a continuous time dependent position of the wave-making resistance reduction points for the follower vessel with respect to the lead vessel when the transverse waves were created.

(vi) The time dependent position of the follower vessel may be processed to a time dependent global (GPS) location.

(vii) The time dependent global location path may be optimized to minimize changes to the follower vessel's speed by using the resistance reduction zones (as opposed to the reduction points) to optimize the path.

(viii) The optimized follower vessel's path calculated using the Vessel Positioning Algorithm is used.

As noted above, the hardware and specific algorithm are exemplary, and it is understood that other process steps may occur, other types of sensors may be used, and other types of information may be obtained.

Figure 17A:
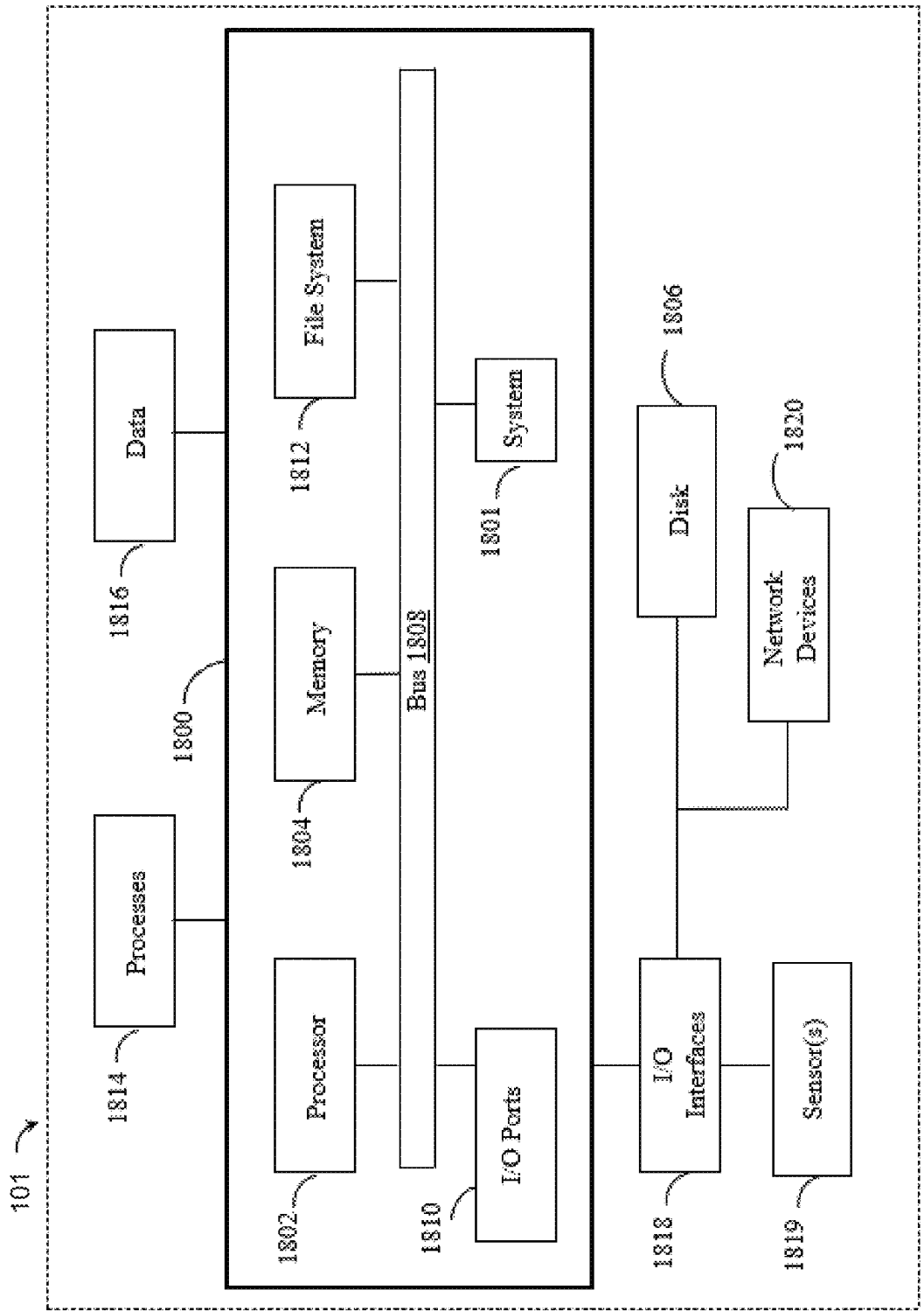
FIG. 17A illustrates a block diagram of an exemplary controller used to operate two or more vessels in controlled position to reduce wave-making resistance according to the present disclosure.
Figure 17B:
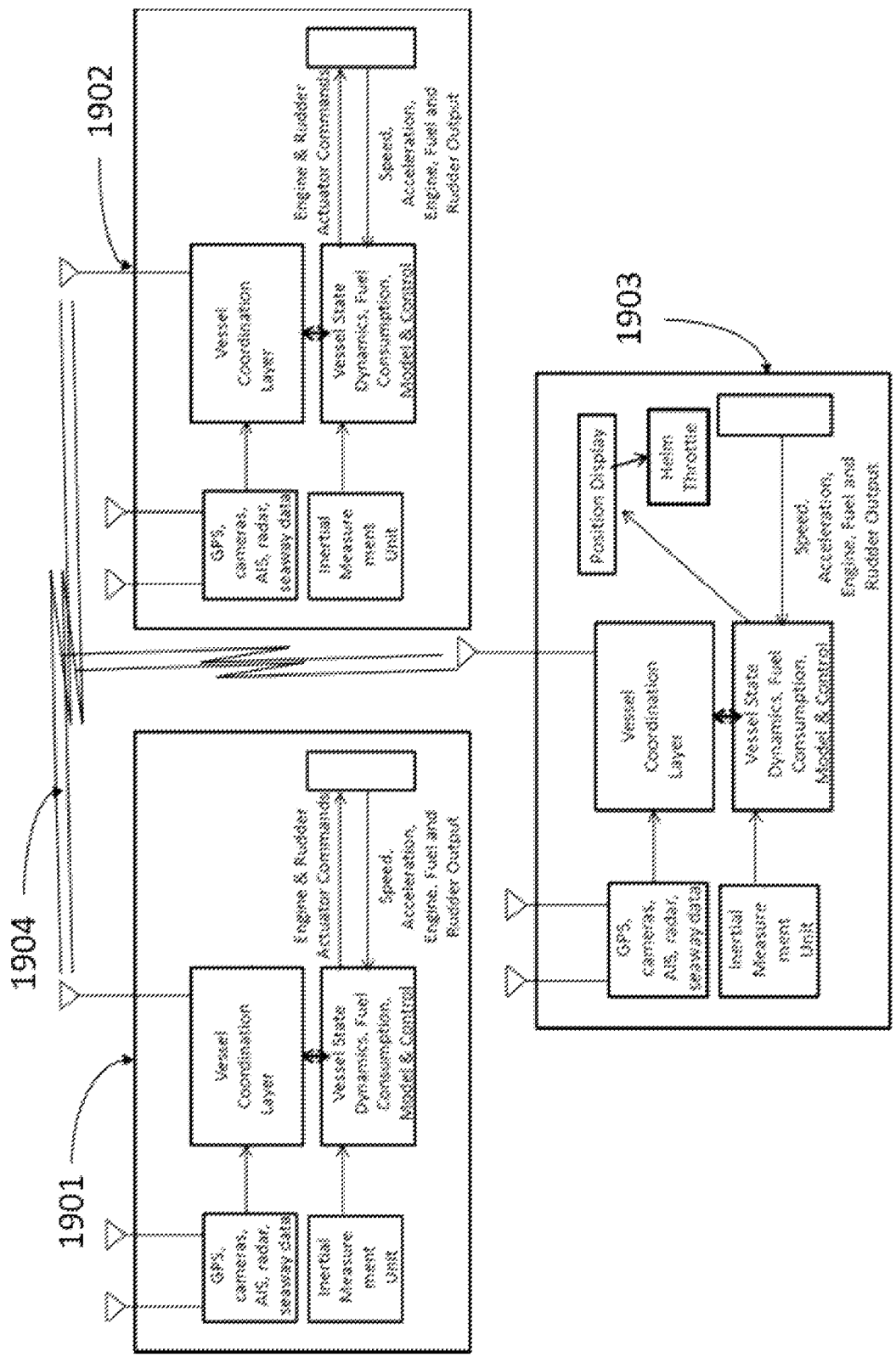
FIG. 17B illustrates a more specific block diagram showing one or more exemplary controllers and/or systems according to an aspect of the present disclosure.

FIG. 17A illustrates a general block diagram of exemplary electronic circuitry and other electronic components and/or information that may be embodied in a system 101 that is configured to carry out the exemplary process(es) illustrated in the foregoing figures, including that of the process(es) illustrated in FIG. 16. As shown, the system 101 includes at least one electronic controller 1800 for operating the process(es) described herein. As shown, the controller 1800 (also referred to as an electronic machine 1800) includes a processor 1802, a memory 1804, I/O Ports 1810, and a file system 1812 operatively connected by a bus 1808. The controller 1800 may also include other general system components 1801 of the system 101.

In one example, the controller 1800 may transmit input and output signals via, for example, I/O Ports 1810 or I/O Interfaces 1818. Thus, the system 101, and its associated components, may be implemented in controller 1800 as hardware, firmware, software, or combinations thereof and, thus, the controller 1800 and its components may provide means for performing functions described herein as performed by the system 101, and its associated components. As shown, one or more sensors 1819 may be implemented in the controller 1800 and connected by the I/O ports 1810 or I/O interfaces 1818 for detecting and measuring information from the environment that is processed by the controller 1800. Such sensor(s) 1819 may include the GPS sensor(s), speed sensor(s), position sensor(s), inertial (IMU) sensor(s), or the like, for obtaining information relative to the environment as described above.

The processor 1802 can be a variety of various processors including dual microprocessor and other multi-processor architectures. The memory 1804 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1806 may be operatively connected to the controller 1800 via, for example, an I/O Interfaces (e.g., card, device) 1818 and an I/O Ports 1810. The disk 1806 can include, but is not limited to, devices like a magnetic disk drive, a solid-state disk drive, a floppy disk drive, a tape drive, a Zip drive, a flash memory card, or a memory stick. Furthermore, the disk 1806 can include optical drives like a CD-ROM, a CD recordable drive (CD-R drive), a CD rewriteable drive (CD-RW drive), or a digital video ROM drive (DVD ROM). The memory 1804 can store processes 1814 or data 1816, for example. The disk 1806 or memory 1804 can store an operating system that controls and allocates resources of the controller 1800.

The bus 1808 can be a single internal bus interconnect architecture or other bus or mesh architectures. While a single bus is illustrated, it is to be appreciated that controller 1800 may communicate with various devices, logics, and peripherals using other buses that are not illustrated (e.g., PCIE, SATA, Infiniband, 1394, USB, Ethernet). The bus 1808 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The controller 1800 may interact with input/output devices via I/O Interfaces 1818 and I/O Ports 1810. Input/output devices can include, but are not limited to, a keyboard, a microphone, a pointing and selection device, cameras, video cards, displays, disk 1806, network devices 1820, and the like. The I/O Ports 1810 can include but are not limited to, serial ports, parallel ports, and USB ports.

The controller 1800 can operate in a network environment and thus may be connected to network devices 1820 via the I/O Interfaces 1818, or the I/O Ports 1810. Through the network devices 1820, the controller 1800 may interact with a network. Through the network, the controller 1800 may be logically connected to remote devices. The networks with which the controller 1800 may interact include, but are not limited to, a local area network (LAN), a wide area network (WAN), and other networks. The network devices 1820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1820 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

It is understood that the various parts of the system 101 may be located in various different locations, which such component(s) may be remote from the fleet of vessels, or may be local to the fleet of vessels. For example, the controller 1800 may be located remotely, such as land-based, sea-based, aerial-based, satellite-based, and/or network-based (e.g., cloud-based). Alternatively or additionally, the controller 1800 may be located locally, such as onboard the at least one follower vessel, onboard the at least one lead vessel, and/or onboard at least one other vessel in the fleet that is not the at least one lead vessel and is not the at least one follower vessel. It is of course understood that the controller 1800 may include multiple controller(s) and associated components as shown in FIG. 17A, and one or more of such controller(s) 1800 may all be located remotely, may all be located locally, or may be located both remotely and locally.

Turning to FIG. 17B, a more specific example of an exemplary system 101 according to the present disclosure is shown, in which the system 101 is shown as a schematic of a fleet formation where each vessel may include a sub-system for carrying out the process(es) described herein. As shown, the system 101 may include a first vessel 1901, a second vessel 1902, and a third vessel 1903 to form a fleet formation operating in the seaway. In this example, the first vessel 1901 may be the lead vessel and the second vessel 1902 and the third vessel 1903 may be follower vessels.

As noted above, and shown in FIG. 17B, the system controller 1800 according to the present disclosure may include a remote-based controller 1800', and also may include controllers 1800a, 1800b, and 1800c onboard the vessels. Any of the controllers (collectively referred to with reference 1800) may perform the process(es) described herein. However, having the requisite information (e.g., Vessel positioning algorithm) and electronics/circuitry in the remote-based (e.g., network (cloud) based) electronic controller 1800' to carry out the process(es) and calculations described herein is beneficial as it may reduce costs of multiple controllers onboard individual vessels. As such, in exemplary embodiment(s) the controllers 1800a-c onboard the vessels 1901-1903 may be conventional controllers to control steering and speed functions of the vessels and to receive commands from the remote-based controller 1800'. Such a remote-based controller 1800' can simultaneously perform the calculations for multiple Collaborative Fleets.

As shown, the remote electronic controller 1800' may communicate to the individual vessel(s) 1901-1903 and their respective controllers 1800a-c via a communications link 1904, such as a radio link. Each of the controllers 1800a-c may receive control signals from the remote-based controller 1800' to send control signals that may directly control movement of the follower vessels 1902 and 1903 (e.g., positional effectors, such as, for example, rudder position and propulsion thrust). Vessel sensors and effectors (e.g., maneuvering and propulsion) may be resident on the vessel(s) where their signals are processed and communicated to the controller(s), whether vessel resident (e.g., 1800a-1800b) or remote (e.g., 1800'), and the calculated positions are communicated to the vessels for where the effectors are controlled, which such functions are separable. As noted in the process(es) above, however, it is understood that while automatic controlling of the positional effectors of the vessels 1902 and 1903, the controllers 1800 may also be configured to provide information necessary for manned operation, such as information displayed on a map that may be utilized by an operator to position the vessel.

As described above and shown in FIG. 17B, the vessels 1901-1903 may include one or more suitable sensors such as, for example, a global positioning system (GPS), cameras, automatic identification system (AIS), radar, light detection and ranging (LIDAR), inertial measurement unit (IMU), or any other suitable sensor. The data gathered by the one or more sensors may be used for determining location, speed, and heading of the vessels, or seaway-induced vessel motions, or any other suitable data. In some implementations, a storage medium provided on each of the vessels 1901-1903 may include a database storing data, such as, for example, data representing seaway-induced vessel motions, reduced wave-making resistance regions, coordinated surge motion and wave-making resistance reduction zones, vessel state dynamics, fuel consumption, model information, control information, speed, heading, acceleration, engine output, fuel output, rudder output, or any other suitable information.

As noted above, the Vessel Positioning algorithm may use the data acquired by the sensor(s) to calculate the time dependent position (e.g., GPS latitude and longitude) for the follower vessel(s) that accounts for perturbations to the lead vessel's speed, water axis heading and position (e.g., GPS). In exemplary embodiments, the Vessel Positioning algorithm calculation process uses time referenced sensor measurements including position (e.g., GPS for global position), time (e.g., GPS system time for time reference), a water direction and speed sensor for water axis heading and speed. The Kelvin wake wave's propagation speed and direction from the point at which they are created may be calculated using wave theory for gravitational water waves. The propagation distance may use computational fluid dynamic (CFD) calculations for the distance from where the Kelvin wake waves are created to where a significant reduction in wave-making resistance occurs (identified as specific points and/or zones, referred to as reduction resistance zone(s)). Output from the Vessel Positioning algorithm may be a time continuous (every second or less) position (e.g., GPS) used to command the follower vessel's speed and heading to maintain the optimum wave-making resistance reduction.

It is understood that embodiments of the subject matter described in this specification can be implemented in combination with digital electronic circuitry, controllers, processors, computer software, firmware, and/or hardware. For example, embodiments may be implemented in an additive manufacturing system that uses one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software-controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in logic or the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including electronic control circuitry that is configured to carry out various control operations relating to control of the system. The control circuitry may be special or general-purpose circuitry. The controller may include, by way of example, a programmable processor, a computer, or multiple processors or computers. For example, the primary control circuit may include an electronic processor, such as a CPU, microcontroller or microprocessor. The operative connection(s) of the controller to the devices in the system includes those in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. The controller may include, in addition to hardware, code that creates an execution environment for the computer program in question. Among their functions, to implement the features described herein, the control circuit and/or electronic processor may comprise an electronic controller that may execute program code embodied as the control application according to the present disclosure. It will be apparent to a person having ordinary skill in the art of computer programming, and specifically in application programming for electronic and communication devices, how to program the device to operate and carry out logical functions and instructions associated with the control application. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network.

The processor may include all apparatus, devices, electronic circuitry, and machines suitable for processing data, including the execution of a computer program. The processor which may include, by way of example, both general and special purpose microprocessors, and any one or more processors of any kind of digital computer. Generally, the processor will receive instructions and data from a read-only memory or a random-access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/ or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for reducing wave-making resistance of at least one follower vessel following at least one lead vessel operating in a seaway, the system comprising at least one electronic processor configured to:

determine at least a direction and propagation speed of at least one first Kelvin wake transverse wave at the location where generated by the at least one lead vessel, wherein the at least one first Kelvin wake transverse wave is generated by the at least one lead vessel at a first time and propagates in the seaway until at least a second time subsequent to the first time;

based at least upon the direction and propagation speed of the at least one first Kelvin wake transverse wave propagating in the seaway from the first time to the second time, determine one or more locations in at least one reduced wave-making resistance region at which to position the at least one follower vessel when the at least one follower vessel and the at least one first Kelvin wake transverse wave are at the second time, wherein the at least one reduced wave-making resistance region is a region in the seaway associated with the at least one first Kelvin wake transverse wave that, when occupied by the at least one follower vessel, reduces the wave-making resistance of the at least one follower vessel by providing destructive cancelation with the at least one first Kelvin wake transverse wave; and output information associated with the determined one or more locations at which to position the at least one follower vessel in the at least one reduced wave-making resistance region associated with the at least one first Kelvin wake transverse wave corresponding to the second time to thereby reduce the wave-making resistance of the at least one follower vessel when at the second time.

2. The system of claim 1, wherein the at least one electronic processor is further configured to:

provide a time-dependent approach for positioning one or more follower vessels in one or more wave-making reduction resistance zones associated with the Kelvin wake waves generated by one or more lead vessels for reducing the wave making resistance of the follower vessels, wherein the time-dependent approach is based at least in part upon a calculation of data associated with the state of the Kelvin wake waves of the one or more lead vessels at a time after the Kelvin wake waves are generated, so as to position the follower vessels in the wave-making reduction resistance zones at that later time, such as to account for variations in the state of the lead vessels when operating in a seaway.

3. The system of claim 1, wherein:

the determining of the at least one reduced wave-making resistance region includes generating a wave making resistance region map that includes magnitudes of wave making resistance for the at least one follower vessel at multiple locations;

the wave making resistance region map is generated by calculating the periodic wave patterns of the at least one first Kelvin wake transverse wave and its interactions with the lead vessel's Kelvin wake diverging wave patterns' to generate a field, and then using this calculation to simulate the location of the follower vessel(s) at multiple locations within the field so as to determine magnitudes of resistance at the multiple locations.

4. The system of claim 3, wherein:
a different wave making resistance map is generated based on each actual or simulated speed of the lead vessel and the follower vessel; and
the different wave making resistance map is generated based on the different speeds and different lead and follower vessel geometries.

5. The system of claim 3, wherein:
the determining at least the direction of the at least one Kelvin wake transverse wave is determined based upon a selection of the first Kelvin wake transverse wave that is associated with a selected wave making resistance region according to the wave making resistance map; and
the determining where to position the at least one follower vessel is based upon a propagation of the selected first Kelvin wake wave from the first time to the second time.

6. The system of claim 1, wherein:
one or more wave-making resistance maps are preprocessed and stored in non-transitory memory, and
the at least one processor retrieves data from the preprocessed maps for selecting the first Kelvin wake transverse wave to be used and determining at least the direction of the selected first Kelvin wake transverse wave.

7. The system of claim 1, wherein:
(i) wave making resistance maps that includes magnitudes of wave making resistance for the at least one follower vessel at multiple locations stored in non-transitory memory in the at least one processor;
(ii) a sequence comprises at least that of
   (i) in the determining at least the direction and speed of the at least one lead vessel at a first time,
   (ii) the determining where to position the at least one follower vessel in the at least one reduced wave-making resistance region of the wave making resistance maps, and
   (iii) the determining of the second time at which the follower vessel is to be positioned in the at least one reduced wave-making resistance region,
   (iv) the outputting the second time and position information; and
(iii) the at least one processor is configured to repeat the sequence at least one or more times at continuous or intermittent time intervals to continuously or intermittently track the at least one lead vessel and continuously or intermittently define the position and time for the at least one follower vessel at the at least one reduced wave-making resistance region associated with the at least one Kelvin wake wave generated by the at least one lead vessel.

8. The system of claim 1, wherein determining the at least one reduced wave-making resistance region is preprocessed before the first time, or is processed in real time prior to the second time.

9. The system of claim 1, wherein the determining of the direction of the at least one first Kelvin wake wave generated at the first time is based at least in part on a first heading of the at least one lead vessel at the first time.

10. The system of claim 1, wherein the at least one reduced wave-making resistance region is determined, and the determining the at least one reduced wave-making resistance region is based at least in part on a first speed of the at least one lead vessel at the first time when the at least one first Kelvin wake wave is generated.

11. The system of claim 1, wherein:
the first speed of the at least one lead vessel is a water-axis speed;
the first heading of the at least one lead vessel is a water-axis heading;
the water-axis speed and the water-axis heading are used to determine a wavelength of the Kelvin wake transverse wave and an alignment of the at least one reduced wave-making resistance region with the resistance reduction map zone alignment.

12. The system of claim 1, wherein:
the determining the at least one reduced wave-making resistance region is performed at the first time, or at an intervening time between the first time and the second time; and/or
the determining the direction of the of the at least one first Kelvin wake wave is performed at the first time or at an intervening time between the first time and the second time; and/or
the determining where to position the at least one follower vessel is performed at the first time or at an intervening time between the first time and the second time.

13. The system of claim 1, wherein the determining where to position the at least one follower vessel is based at least in part on determining a propagation of the at least one first Kelvin wake wave in the determined direction when generated at the first time.

14. The system of claim 1, wherein:
the determining of the at least one reduced wave-making resistance region is based at least in part on determining a periodic Kelvin wake transverse wave pattern of the at least one first lead vessel; and
the periodic wave pattern of the at least one lead vessel is based at least in part on a speed of the at least one lead vessel when at the first time.

15. The system of claim 1, wherein:
the determining of the at least one reduced wave-making resistance region is based at least in part on determining the lead vessel's Kelvin wake diverging wave patterns' interactions with the Kelvin wake transverse wave patterns to determine one or more angles along the first Kelvin wake transverse wave that include one or more reduced wave making resistance regions compared to other regions along the first Kelvin wake transverse wave; and
the one or more angles along the first Kelvin wake transverse wave associated with the optimal reduced wave making resistance regions diverge outwardly toward a cusp of the Kelvin wake of the lead vessel as the speed of the lead vessel increases.

16. The system of claim 1, wherein:
the determining where to position the at least one follower vessel in the at least one reduced wave-making resistance region is based at least in part on a location of the at least one lead vessel at the first time.

17. The system of claim 1, wherein:
the determining where to position the at least one follower vessel in the at least one reduced wave-making resistance region is based at least in part on tracking locations of at least one of the lead vessel; and
the tracking includes time posts and associated position posts of the lead vessel and/or the follower vessel at the locations which are received from one or more GPS sensors.

18. The system of claim 1, wherein: determining the at least one reduced wave-making resistance region is determined empirically by actually positioning the at least one follower vessel at different locations within the Kelvin wake of the lead vessel, measuring the actual wave-making resistance or other means of vessel powering performance such as propulsor shaft torque, rpm, fuel consumption rate or the like at those locations.

19. The system of claim 1, wherein:
determining where to position the at least one follower vessel in the at least one reduced wave-making resistance region so as provide destructive cancellation includes at least predominantly destructively canceling at least one Kelvin wake transverse wave generated by the at least one follower vessel at the second time.

20. The system of claim 1, wherein:
(i) at least the speed, the heading, the timing and/or the location of the at least one lead vessel is ascertained by gathering information from at least one sensor in operative communication with the at least one processor; and/or
(ii) at least the speed, the heading, the timing and/or the location of the at least one follower vessel is ascertained by gathering information from at least one sensor in operative communication with the at least one processor; and
(iii) the at least speeds, headings, and/or the locations are continuous or intermittent are ascertained at time intervals to continuously or intermittently track the at least one lead vessel and continuously or intermittently define the position and time for the at least one follower vessel.

21. The system of claim 1, wherein the information output from the at least one processor is used to control the at least one follower vessel.

22. The system of claim 1, wherein:
the output information is used to automatically adjust the positioning of the at least one follower vessel; and/or
the output information is output to a display for an operator to adjust the positioning of the at least one following vessel based at least in part upon the output information on the display; and/or
the output information is output to a non-transitory computer readable medium in the form of data for subsequent use.

23. The system of claim 1, configured to:
continuously ascertain position, speed and heading of the at least one lead vessel at continuing time posts that are subsequent to the first time, and determine at least a direction of subsequent Kelvin wake waves of the at least one lead vessel, wherein the subsequent Kelvin wake waves are generated by the at least one lead vessel at the subsequent times;
at the subsequent times, determine subsequent reduced wave-making resistance regions associated with the respective subsequent Kelvin wake waves generated by the lead vessel at the subsequent times;
at the subsequent times, determine subsequent one or more locations at which to position the at least one follower vessel in the determined subsequent reduced wave-making resistance regions;
continuously construct an at least one lead vessel track of the continuously ascertained positions as coordinated by the at least one lead vessel time posts; and continuously construct an at least one follower vessel track of the continuously determined positions for the follower vessel in the reduced wave-making resistance regions for reducing the wave-making resistance of the at least one follower vessel as coordinated by the at least one lead vessel time posts; and output information associated with the determined at least one follower vessel track of the continuously determined positions for reducing the wave-making resistance of the at least one follower vessel as coordinated by the at least one lead vessel time posts, thereby reducing the wave-making resistance of the at least one follower vessel as the at least one follower vessel tracks the continuously determined region for reducing the wave-making resistance as coordinated by the at least one lead vessel time posts.

24. The system of claim 1, wherein the processor is further configured to define the reduced wave-making resistance region where a specified percentage (80 percent) of the maximum reduced wave-making resistance in the region can be achieved.

25. The system of claim 1, wherein the processor is further configured to determine where to position the at least one follower vessel in the reduced wave-making resistance region such that crests of the lead vessel's Kelvin wake transverse wave as propagated at the second time are aligned with troughs of the follower vessel's Kelvin wake transverse wave generated at the second time, and/or such that troughs of the lead vessel's Kelvin wake transverse wave are aligned with crests of the follower vessel's Kelvin wake transverse wave.

26. The system of claim 1, wherein:
determining the at least one reduced wave-making resistance region associated with the at least one first Kelvin wake transverse wave is based upon an interaction of the first Kelvin wake transverse wave with diverging waves generated at the first time; and
the determining is based at least partially upon the speed of the lead vessel such that as speed increases the at least one reduced wave-making resistance regions diverges outwardly from a centerline of the Kelvin wake.

27. The system of claim 1, further comprising one or more sensors configured to measure information including position and speed information of the at least one lead vessel and the seaway-induced vessel motion data of the one or more vessels in the fleet, wherein:
the at least one electronic controller is further configured to obtain the data, including the position and speed data of at least one lead vessel in the fleet, and the seaway-induced vessel motion data of one or more vessels in the fleet, from the information measured by the one or more sensors.

28. A method for reducing wave-making resistance of at least one follower vessel following at least one lead vessel operating in a seaway over a period of time, the method comprising:
determining at least a direction and propagation speed of at least one first Kelvin wake transverse wave at the location where generated by the at least one lead vessel, wherein the at least one first Kelvin wake transverse wave is generated by the at least one lead vessel at a first time and propagates in the seaway until at least a second time subsequent to the first time;
based at least upon the direction and propagation speed of the at least one first Kelvin wake transverse wave propagating in the seaway from the first time to the second time, determining one or more locations in at least one reduced wave-making resistance region at which to position the at least one follower vessel when the at least one follower vessel and the at least one first Kelvin wake transverse wave are at the second time, wherein the at least one reduced wave-making resistance region is a region in the seaway associated with the at least one first Kelvin wake transverse wave that, when occupied by the at least one follower vessel, reduces the wave-making resistance of the at least one follower vessel by providing destructive cancelation with the at least one first Kelvin wake transverse wave; and outputting information associated with the determined one or more locations at which to position the at least one follower vessel in the at least one reduced wave-making resistance region associated with the at least one first Kelvin wake transverse wave corresponding to the second time to thereby reduce the wave-making resistance of the at least one follower vessel when at the second time.

29. The method of claim 28, further comprising:
providing a time-dependent approach for positioning one or more follower vessels in one or more wave-making reduction resistance zones associated with the Kelvin wake waves generated by one or more lead vessels for reducing the wave making resistance of the follower vessels, wherein the time-dependent approach is based at least in part upon a calculation of data associated with the state of the Kelvin wake waves of the one or more lead vessels at a time after the Kelvin wake waves are generated, so as to position the follower vessels in the wave-making reduction resistance zones at that later time, such as to account for variations in the state of the lead vessels when operating in a seaway.

30. The method of claim 28, wherein:
the determining of the at least one reduced wave-making resistance region includes generating a wave making resistance region map that includes magnitudes of wave making resistance for the at least one follower vessel at multiple locations;
the wave making resistance region map is generated by calculating the periodic wave patterns of the at least one first Kelvin wake transverse wave and its interactions with the lead vessel's Kelvin wake diverging wave patterns' to generate a field, and then using this calculation to simulate the location of the follower vessel(s) at multiple locations within the field so as to determine magnitudes of resistance at the multiple locations.

31. The method of claim 28, wherein:
a different wave making resistance map is generated based on each actual or simulated speed of the lead vessel and the follower vessel; and
the different wave making resistance map is generated based on the different speeds and different lead and follower vessel geometries.

32. The method of claim 28, wherein:
the determining at least the direction of the at least one Kelvin wake transverse wave is determined based upon a selection of the first Kelvin wake transverse wave that is associated with a selected wave making resistance region according to the wave making resistance map; and
the determining where to position the at least one follower vessel is based upon a propagation of the selected first Kelvin wake wave from the first time to the second time.

33. The method of claim 28, wherein the determining of the direction of the at least one first Kelvin wake wave generated at the first time is based at least in part on a first heading of the at least one lead vessel at the first time.

34. The method of claim 28, wherein the at least one reduced wave-making resistance region is determined, and the determining the at least one reduced wave-making resistance region is based at least in part on a first speed of the at least one lead vessel at the first time when the at least one first Kelvin wake wave is generated.

35. The method of claim 28, wherein:
the first speed of the at least one lead vessel is a water-axis speed;
the first heading of the at least one lead vessel is a water-axis heading;
the water-axis speed and the water-axis heading are used to determine a wavelength of the Kelvin wake transverse wave and an alignment of the at least one reduced wave-making resistance region with the resistance reduction map zone alignment.

36. The method of claim 28, wherein:
the determining the at least one reduced wave-making resistance region is performed at the first time, or at an intervening time between the first time and the second time; and/or
the determining the direction of the of the at least one first Kelvin wake wave is performed at the first time or at an intervening time between the first time and the second time; and/or
the determining where to position the at least one follower vessel is performed at the first time or at an intervening time between the first time and the second time.

37. The method of claim 28, wherein the determining where to position the at least one follower vessel is based at least in part on determining a propagation of the at least one first Kelvin wake wave in the determined direction when generated at the first time.

38. The method of claim 28, wherein:
the determining of the at least one reduced wave-making resistance region is based at least in part on determining a periodic Kelvin wake transverse wave pattern of the at least one first lead vessel; and
the periodic wave pattern of the at least one lead vessel is based at least in part on a speed of the at least one lead vessel when at the first time.

39. The method of claim 28, wherein:
the determining of the at least one reduced wave-making resistance region is based at least in part on determining the lead vessel's Kelvin wake diverging wave patterns' interactions with the Kelvin wake transverse wave patterns to determine one or more angles along the first Kelvin wake transverse wave that include one or more reduced wave making resistance regions compared to other regions along the first Kelvin wake transverse wave; and
the one or more angles along the first Kelvin wake transverse wave associated with the optimal reduced wave making resistance regions diverge outwardly toward a cusp of the Kelvin wake of the lead vessel as the speed of the lead vessel increases.

40. The method of claim 28, wherein:
the determining where to position the at least one follower vessel in the at least one reduced wave-making resistance region is based at least in part on tracking locations of at least one of the lead vessel; and
the tracking includes time posts and associated position posts of the lead vessel and/or the follower vessel at the locations which are received from one or more GPS sensors.

41. The method of claim 28, wherein:
determining where to position the at least one follower vessel in the at least one reduced wave-making resistance region so as provide destructive cancellation includes at least predominantly destructively canceling at least one Kelvin wake transverse wave generated by the at least one follower vessel at the second time.

42. The method of claim 28, configured to:
continuously ascertain position, speed and heading of the at least one lead vessel at continuing time posts that are subsequent to the first time, and determine at least a direction of subsequent Kelvin wake waves of the at least one lead vessel, wherein the subsequent Kelvin wake waves are generated by the at least one lead vessel at the subsequent times;
at the subsequent times, determine subsequent reduced wave-making resistance regions associated with the respective subsequent Kelvin wake waves generated by the lead vessel at the subsequent times;
at the subsequent times, determine subsequent one or more locations at which to position the at least one follower vessel in the determined subsequent reduced wave-making resistance regions;
continuously construct an at least one lead vessel track of the continuously ascertained positions as coordinated by the at least one lead vessel time posts; and continuously construct an at least one follower vessel track of the continuously determined positions for the follower vessel in the reduced wave-making resistance regions for reducing the wave-making resistance of the at least one follower vessel as coordinated by the at least one lead vessel time posts; and
output information associated with the determined at least one follower vessel track of the continuously determined positions for reducing the wave-making resistance of the at least one follower vessel as coordinated by the at least one lead vessel time posts, thereby reducing the wave-making resistance of the at least one follower vessel as the at least one follower vessel tracks the continuously determined region for reducing the wave-making resistance as coordinated by the at least one lead vessel time posts.

43. The method of claim 28, wherein the processor is further configured to determine where to position the at least one follower vessel in the reduced wave-making resistance region such that crests of the lead vessel's Kelvin wake transverse wave as propagated at the second time are aligned with troughs of the follower vessel's Kelvin wake transverse wave generated at the second time, and/or such that troughs of the lead vessel's Kelvin wake transverse wave are aligned with crests of the follower vessel's Kelvin wake transverse wave.

44. The method of claim 28, wherein:
determining the at least one reduced wave-making resistance region associated with the at least one first Kelvin wake transverse wave is based upon an interaction of the first Kelvin wake transverse wave with diverging waves generated at the first time; and
the determining is based at least partially upon the speed of the lead vessel such that as speed increases the at least one reduced wave-making resistance regions diverges outwardly from a centerline of the Kelvin wake.

45. The method of claim 28, further comprising one or more sensors configured to measure information including position and speed information of the at least one lead vessel and the seaway-induced vessel motion data of the one or more vessels in the fleet, wherein:
the at least one electronic controller is further configured to obtain the data, including the position and speed data of at least one lead vessel in the fleet, and the seaway-induced vessel motion data of one or more vessels in the fleet, from the information measured by the one or more sensors.

\* \* \* \* \*